United States Patent
Luo et al.

(10) Patent No.: US 11,988,610 B2
(45) Date of Patent: May 21, 2024

(54) DETECTION AND GRADING OF THE EFFECT OF BLUE FLUORESCENCE ON DIAMOND APPEARANCES

(71) Applicant: Gemological Institute of America, Inc. (GIA), Carlsbad, CA (US)

(72) Inventors: Yun Luo, Carlsbad, CA (US); David Nelson, Carlsbad, CA (US); Troy Ardon, Carlsbad, CA (US); Christopher M. Breeding, Carlsbad, CA (US)

(73) Assignee: Gemological Institute of America, Inc. (GIA), Carlsbad, CA (US)

( * ) Notice: Subject to any disclaimer, the term of this patent is extended or adjusted under 35 U.S.C. 154(b) by 341 days.

(21) Appl. No.: 17/555,241

(22) Filed: Dec. 17, 2021

(65) Prior Publication Data

US 2022/0196565 A1   Jun. 23, 2022

Related U.S. Application Data

(60) Provisional application No. 63/127,125, filed on Dec. 17, 2020.

(51) Int. Cl.
  *G01N 21/88* (2006.01)
  *G06T 7/13* (2017.01)
  *G06V 10/141* (2022.01)
  *G06V 10/60* (2022.01)
  *G06V 20/69* (2022.01)

(52) U.S. Cl.
  CPC ..... *G01N 21/8851* (2013.01); *G01N 21/8806* (2013.01); *G06T 7/13* (2017.01); *G06V 10/141* (2022.01); *G06V 10/60* (2022.01); *G06V 20/693* (2022.01); *G01N 2021/8835* (2013.01); *G01N 2021/8854* (2013.01); *G01N 2021/8887* (2013.01); *G06T 2207/20224* (2013.01)

(58) Field of Classification Search
  CPC .......... G01N 21/8851; G01N 21/8806; G01N 2021/8835; G01N 2021/8887; G06T 7/13; G06T 2207/20224; G06V 10/141; G06V 10/60; G06V 20/693
  See application file for complete search history.

(56) References Cited

U.S. PATENT DOCUMENTS

| | | | | |
|---|---|---|---|---|
| 5,133,792 A | * | 7/1992 | Purohit | ..... B01J 19/02 134/28 |
| 7,999,966 B2 | * | 8/2011 | Fritz | ..... H04N 1/34 358/1.6 |

(Continued)

FOREIGN PATENT DOCUMENTS

| | | |
|---|---|---|
| TW | 201702576 A | 1/2017 |
| TW | 201823705 A | 7/2018 |

OTHER PUBLICATIONS

ASTM E 284. Standard Terminology of Appearance. ASTM Standards on Color and Appearance Measurement, Fifth Edition, 25 pages.

(Continued)

*Primary Examiner* — Elias Desta
(74) *Attorney, Agent, or Firm* — DLA Piper LLP (US)

(57) ABSTRACT

Systems and methods here may be used for analyzing images of gemstones to automatically assign a haziness and/or fluorescence grade to the gemstone using contrast analysis on pixelated, digital images of the gemstones.

14 Claims, 32 Drawing Sheets
(23 of 32 Drawing Sheet(s) Filed in Color)

(56) References Cited

U.S. PATENT DOCUMENTS

| | | | |
|---|---|---|---|
| 11,760,643 B2* | 9/2023 | Shearman | C01B 32/26 423/446 |
| 2006/0196858 A1 | 9/2006 | Barron et al. | |
| 2010/0085487 A1 | 4/2010 | Sarkar et al. | |
| 2018/0082116 A1 | 3/2018 | Navot et al. | |
| 2019/0324956 A1 | 10/2019 | Verboven et al. | |

OTHER PUBLICATIONS

Bouman, Marleen & Anthonis, Ans & Smans, Stefan & Corte, Katrien & Chapman, John. (2018). The Effect of Blue Fluorescence on the Colour Appearance of Round-Brilliant-Cut Diamonds. The Journal of Gemmology. 36. 298-315. 10.15506/JoG.2018.36.4.298, 124 pages.

Cowing, Michael. (2010). The over-grading of blue-fluorescent diamonds: the problem, the proof and the solutions. The Journal of Gemmology. 32. 38-51. 10.15506/JoG.2010.32.1-4.38, 14 pages.

Eaton-Magaña, Sally & Ardon, Troy & Breeding, Christopher & Shigley, James. (2019). Natural-Color Fancy White and Fancy Black Diamonds: Where Color and Clarity Converge. Gems and Gemology. 55. 320. 10.5741/GEMS.55.3.320, 18 pages.

Gu, Tingting & Ohfuji, Hiroaki & Wang, Wuyi. (2019). Origin of milky optical features in type IaB diamonds: Dislocations, nano-inclusions, and polycrystalline diamond. American Mineralogist. 104. 652-658. 10.2138/am-2019-6699, 8 pages.

King, John & Geurts, Ron & Gilbertson, Al & Shigley, James. (2008). Color Grading "D-to-Z" Diamonds at the GIA Laboratory. Gems & Gemology. 44. 296-321. 10.5741/GEMS.44.4.296, 27 pages.

King, John & Moses, Thomas & Shigley, James & Liu, Yan. (1994). Color Grading of Colored Diamonds in the GIA Gem Trade Laboratory. Gems & Gemology. 30. 220-242. 10.5741/GEMS.30. 4.220, 150 pages.

Luo and Breeding (2013). Fluorescence Produced by Optical Defects in Diamond, Gems & Gemology, vol. 49, No. 2, 16 pages.

Moses, Thomas & Reinitz, Ilene & Johnson, Mary & King, John & Shigley, James. (1997). A Contribution to Understanding the Effect of Blue Fluorescence on the Appearance of Diamonds. Gems & Gemology. 33. 10.5741/GEMS.33.4.244, 16 pages.

* cited by examiner

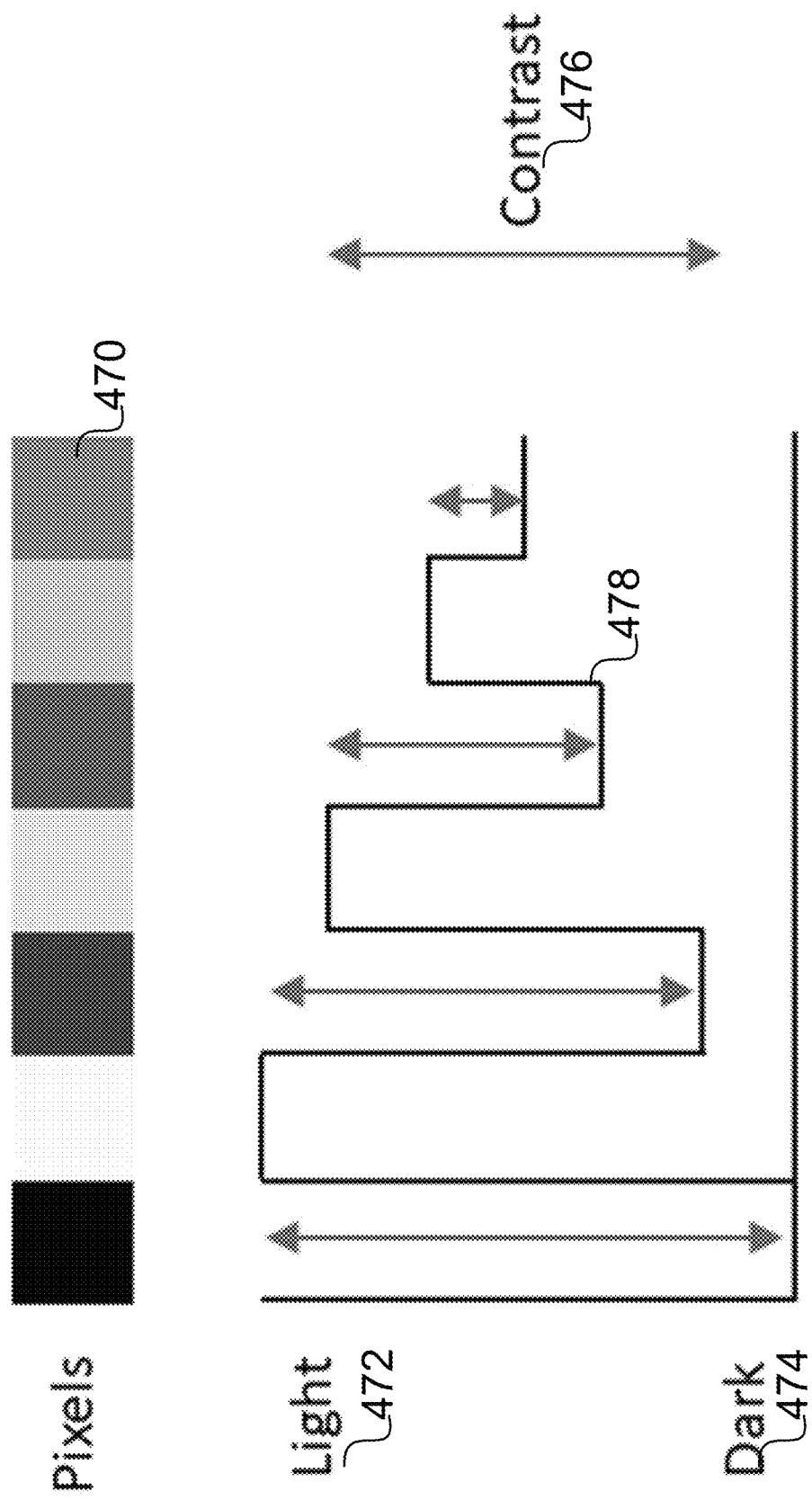

DETECTION AND GRADING OF THE EFFECT OF BLUE FLUORESCENCE ON DIAMOND APPEARANCES

CROSS REFERENCE TO RELATED APPLICATION

This application claims priority to U.S. Provisional Application No. 63/127,125 filed on Dec. 17, 2020, titled "MEASUREMENT AND CHARACTERIZATION OF THE EFFECT OF BLUE FLUORESCENCE ON THE APPEARANCE OF DIAMONDS," the entirety of which is hereby incorporated by reference.

FIELD

The field includes analysis and grading of gemstones using daylight and blue fluorescence and computer analysis of digital images to grade gemstones including haziness and fluorescence of gemstones.

BACKGROUND

The appearance of fluorescence in diamonds has generated discussions in the trade for decades. It is believed that diamonds with D to F color grades (i.e., colorless) which do not possess enough body color to offset the degree of fluorescence, are prone to appear hazy when combined with strong or very strong blue fluorescence. Lower color diamonds with medium to very strong blue fluorescence may appear up to one grade better due to the blue fluorescence neutralizing the yellow body color. The diamond trade has expressed concerns of over-grading in these situations because the diamond color graded under a light source containing UV doesn't represent the true body color of the diamond. Conversely, some global markets believe that fluorescence may have a beneficial impact on color and thus will sell lower color diamonds with fluorescence at a slight premium.

Based on visual observations under different lighting conditions, several examples have investigated the effect of blue fluorescence on the color and overall appearance of diamonds. Some concluded that strong blue fluorescent diamonds were perceived to have a better color appearance when viewed face-up with no discernible trend table-down, and there is no observable relationship between fluorescence and transparency found that diamonds observed table-down in outdoor conditions showed improved color grades, whereas in the face-up position, the fluorescence did not directly correlate with the diamond color grade.

Historically, there were three major challenges that needed to be overcome in order to better understand the effect of fluorescence on diamond appearance: lack of a settled methodology to quantify color and fluorescence, color and fluorescence corresponding to a range of values, and lack of an accepted illumination method.

The lack of a characterization system, together with the fact that both color grades and fluorescence descriptions correspond to a range of values make consistent and accurate visual comparison difficult. For example, if a high K (closer to J) color stone is chosen with medium-low blue fluorescence to compare with a low K color (closer to L) stone with medium-high blue fluorescence, the effect of medium fluorescence on the K color stone will be different for each of these two samples because they fall at opposite ends of continuous, yet independent ranges for both color and fluorescence. Even with carefully aligned visual observations and spectroscopy-based measurement techniques for color and fluorescence, still missing may be image-based measurements that more accurately reflect how the stones appear in real life and can be directly linked to human visual perception. No previous work has utilized imaging systems to demonstrate and quantify the effects of fluorescence on diamond appearance. Even if the effect of fluorescence on the face-up color may be visually identified by comparing very strong fluorescent stones against inert stones under certain lighting conditions, these differences are not readily obvious in images taken under different lighting environments. FIG. 1A shows the famous 127-ct Portuguese diamond 102 at the Smithsonian Institution. It has been cited as a classic example of a very strong blue fluorescent diamond displaying a noticeable oily or hazy appearance. Pictures of this legendary diamond taken under different lighting setups show different aspects of its appearance, including clarity, color, and haziness. It is not easy to find the right combination of illumination and camera resolution to accurately and precisely display these effects with good reproducibility.

The last challenge, is the method of illumination for color measurement and visual observation and whether a light source for diamond color grading should possess key daylight elements, including a UV component to truly and accurately represent how a diamond appears to the human eye. There is a need for an illumination that includes UV content and thus takes into consideration the effects of fluorescence on diamond appearance.

SUMMARY

Systems and methods here may be used for automatically grading a diamond haziness, the method including capturing a digital image of a diamond with a digital camera, analyzing pixels in the digital image of the diamond by assigning a brightness value to each pixel in the captured image, plotting a count of each of the brightness values of the pixels in the digital image, wherein the plot of the count of each of the brightness values includes a curve on a dark side of the brightness values and a curve on a light side of the brightness values, determining a center of the dark curve in the plot of the count of each of the brightness values of the pixels in the digital image and the associated brightness average of the dark curve, determining a center of the light curve in the plot of the count of each of the brightness values of the pixels in the digital image and the associated brightness average of the light curve, determining a difference between the brightness average of the light curve and the brightness average of the dark curve, using the difference between the brightness average of the light curve and the brightness average of the dark curve to assign a haziness score to the diamond. In some examples, additionally or alternatively, the charting of the brightness values in the pixels is of all pixels in the captured image, wherein any background pixels are discounted. In some examples, additionally or alternatively, the charting of the brightness values in the pixels is of pixels determined to be of the diamond and not a background. In some examples, additionally or alternatively, the determination of the diamond is by pixel edge detection. In some examples, additionally or alternatively, the using the difference between the brightness average of the light curve and the brightness average of the dark curve to assign a haziness score to the diamond is by comparing the difference between the brightness average of the light curve and the brightness average of the dark curve to a lookup table of predetermined scores to determine the haziness score. In some examples, additionally or alternatively, the using the difference between the brightness average of the light curve and the brightness average of the dark curve to assign a haziness score to the diamond is by entering the difference between the brightness average of the light curve and the brightness average of the dark curve into an algorithm that determines the haziness score. In some examples, additionally or alternatively, a light illuminating the diamond for imaging includes 2% ultraviolet light. In some examples, additionally or alternatively, before analyzing pixels in the digital image of the diamond by assigning a brightness value to each pixel in the captured image, capturing a digital image of a calibration setup, the calibration setup including a plurality of brightness standards, comparing the digital image of the calibration setup to known brightness values of the plurality of brightness standards to determine a brightness calibration curve. In some examples, additionally or alternatively, after analyzing pixels in the digital image of the diamond by assigning a brightness value to each pixel in the captured image, applying the determined brightness calibration curve to the analyzed pixels in the digital image of the diamond. In some examples, additionally or alternatively, adjusting the light for illuminating the diamond to change the % ultraviolet, capturing a second digital image of a diamond with a digital camera, analyzing pixels in the second digital image of the diamond by assigning a brightness value to each pixel in the captured image, plotting a count of each of the brightness values of the pixels in the second digital image, wherein the plot of the count of each of the brightness values of the second digital image includes a curve on a dark side of the brightness values and a curve on a light side of the brightness values, determining a center of the dark curve in the plot of the count of each of the brightness values of the pixels in the second digital image and the associated brightness average of the dark curve, determining a center of the light curve in the plot of the count of each of the brightness values of the pixels in the second digital image and the associated brightness average of the light curve, determining a difference between the brightness average of the light curve and the brightness average of the dark curve in the second digital image, using the difference between the brightness average of the light curve and the brightness average of the dark curve of the second digital image to assign a second haziness score to the diamond, using a difference between the haziness score and the second haziness score to determine if the adjustment of the UV % in the light affected the second haziness score.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the embodiments described in this application, reference should be made to the Detailed Description below, in conjunction with the following drawings in which like reference numerals refer to corresponding parts throughout the FIG.s.

FIG. 4C includes illustrations of contrast examples according to certain aspects described herein;

DETAILED DESCRIPTION

Figure 1A:
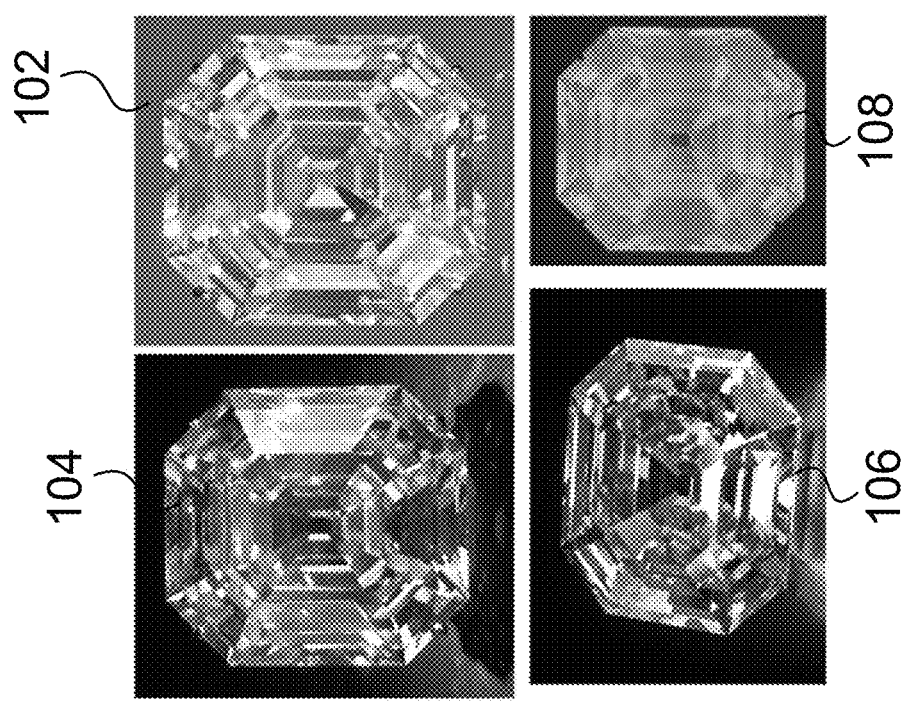
FIG. 1A is an illustration of a stone exhibiting aspects under analysis according to certain aspects described herein.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the particular embodiments. In other instances, well-known data structures, timing protocols, software operations, procedures, and components have not been described in detail so as not to unnecessarily obscure aspects of the embodiments herein.

Overview

Reaction to Blue Fluorescence light on a gemstone is often considered by consumers and dealers when considering a value of a gemstone as it may be perceived to affect clarity or haziness of a gem. However, this effect is often misconstrued and confused. Historical believed beliefs on impact of gemstones in terms of fluorescence reaction, the impact may be devalued, often incorrectly. The systems and methods described here may provide accurate prospective and context on the fluorescence impact on any given gemstone for haziness or clarity of such gemstones such as diamonds.

The effects of blue fluorescence on the appearance of diamonds, including table-down body color, face-up color, brightness, and transparency may be quantitatively characterized using customized measurement and analysis systems. Ultraviolet (UV) intensity in the analysis light source may affect table-down body color, face-up color, and brightness of the diamonds. A settled lighting environment containing a fixed amount of UV component may be used for accurate and consistent color evaluation that fully incorporates the effect of blue fluorescence. The so-called hazy appearance that may impact apparent diamond transparency may be attributed to light scattering from structural defects, but strong fluorescence may also cause minor contrast loss in the face-up patterns of some polished diamonds. The presence of both strong fluorescence and light scattering structural defects may increase the apparent haziness. The transparency changes induced by structural defects, fluorescence, or both may be characterized by a bulk contrast evaluation method using the diamond face-up pattern. Fluorescence is an intrinsic property of diamond that can improve the color of some stones when they are exposed to a lighting environment with significant UV content, such as daylight, but fluorescence alone may not noticeably decrease the transparency of the diamonds.

Systems and methods here may be used to customize image-based measurement and analysis systems to quantitatively characterize the effect of fluorescence on the color, brightness, e.g. the internal and external white light return, and transparency of gem diamonds viewed in both table-down and face-up orientations under well characterized lighting conditions. This may help provide a better understanding of the effect of blue fluorescence on diamond appearance and quantify it instrumentally. This may help to reduce the confusion and biases in the industry and serve as a solid scientific foundation to ensure public trust with respect to diamond fluorescence. It may also be used to automatically grade the haziness, clarity and/or fluorescence of a gemstone such as a diamond using digital image analysis.

FIG. 1A again shows pictures of the Portuguese diamond 102, weighing 127.01 carats, which was graded by GIA as M color and VS1 clarity with very strong blue fluorescence. It has been quoted as a classic example of a stone being over blue and exhibiting a noticeable oily or hazy appearance. Pictures taken under different lighting conditions and settings 104, 106, 108 show different appearances. Systems and methods here may be used to image such a gemstone under both daylight and Ultra Violet (UV) conditions and automatically assign a haziness or clarity score, and/or a fluorescence score to the diamond.

Light Interaction with Diamonds

Figure 1B:
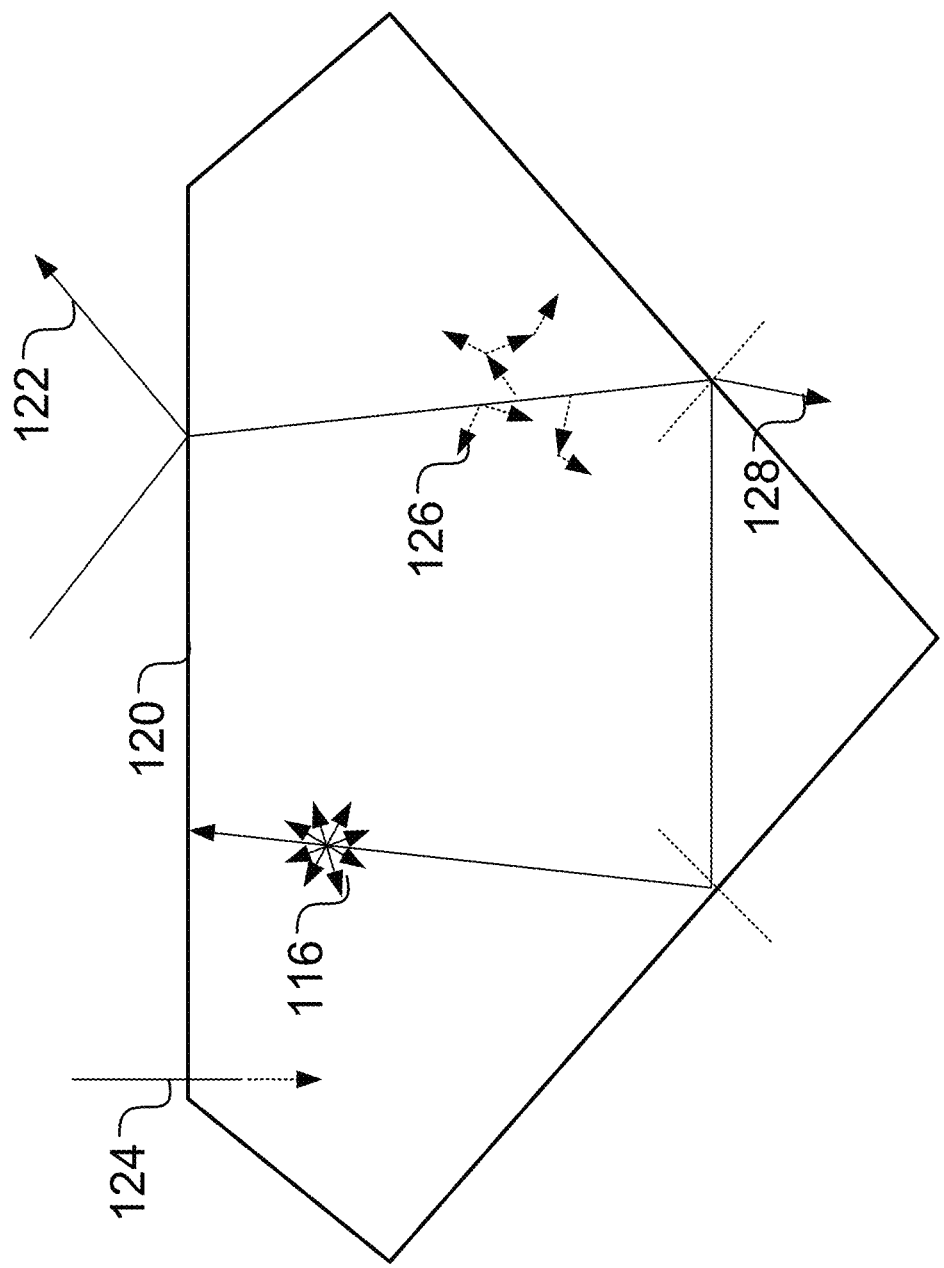
FIG. 1B is an illustration of fluorescence examples under analysis according to certain aspects described herein.

As discussed throughout, light can interact with a faceted diamond 120 in several different ways as shown in FIG. 1B. When light strikes a diamond, a small fraction of the light is reflected 122 while the rest is transmitted through the stone. As the light is passing through the diamond, it may be absorbed 124 and/or scattered 126 by atomic-scale defects in the diamond structure or inclusions, or it can be internally reflected by specially arranged facets in a well cut diamond. Ultimately, the resultant wavelengths of light which are transmitted 128 out of the stone 120 and return to the observer create the color of the diamond shown for example in FIG. 1B. Scattering 126 occurs when the transmitted and internally reflected light interacts with microscopic foreign particles or atomic-scale structural imperfections, thereby causing the light to change wavelengths. In most cases, scattering 126 is thought to be responsible for an apparent reduction in contrast and a hazy appearance. When the particulate matter that is often responsible for light scattering is equal or smaller in size to the wavelength of light in the visible range (400 nm to 750 nm), the scattering may cause a milky opalescence phenomenon in gem stones, which is also known as the Tyndall effect. While scattering 126 affects the appearance, absorption of the light by atomic scale defects tends to have the greatest impact on the color observed from a diamond by preventing particular wavelengths from being transmitted to human eyes. Additionally, when the UV component of light is absorbed by some diamond defects, additional light of a different wavelength in the visible range is often emitted and is known as fluorescence 116. The impact of blue fluorescence, which may be the most common fluorescence color from natural diamond, on the appearance of faceted diamonds is examined here.

Color Space

Figure 1C:
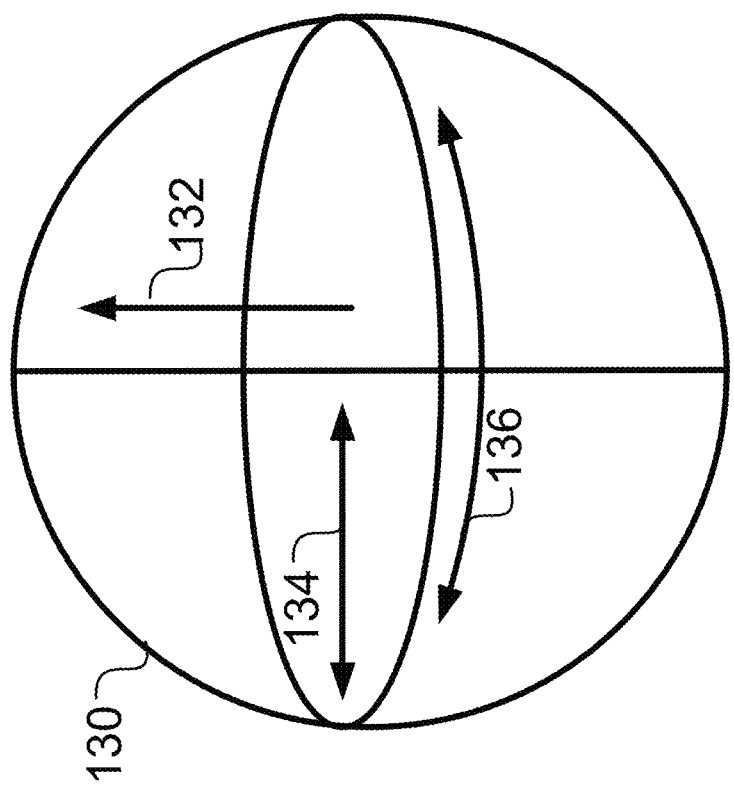
FIG. 1C is an illustration of lightness, chroma, and hue examples under analysis according to certain aspects described herein.

FIG. 1C. Conventional color space 130 includes three attributes: Lightness 132, Chroma 134, and Hue 136. There are different color spaces defined by the color science community to communicate and express the color of objects. One example way to describe color is in terms of hue, tone and saturation. Hue refers to the diamond's characteristic color; tone refers to the color's relative lightness or darkness; and saturation describes the color's depth or strength. For example, CIE L*C*H color space shown for example in FIG. 1C, may be used according to convention to evaluate color attributes and accurately express color and fluorescence intensity measurements in numerical terms. In this color space, L indicates Lightness 132, which is also referred to as tone, C represents Chroma 134, also known as saturation, and H is the Hue angle 136.

Hue 136: The attribute of color perception by means of which a color is judged to be red, orange, yellow, green, blue, purple, or intermediate between adjacent pairs of these, considered in a close ring.

Lightness (tone) 132: Attribute by which a perceived color is judged to be equivalent to one of a series of grays ranging from black to white.

Chroma (saturation) 134: Attribute of color used to indicate the degree of departure of the color from a gray of the same lightness. It typically refers to a color's purity, intensity or saturation.

Color and Fluorescence Examples

Two different analyses may be made under daylight approximating conditions for a color analysis and under higher content Ultra Violet UV conditions for a fluorescence grading analysis.

Figure 1D:
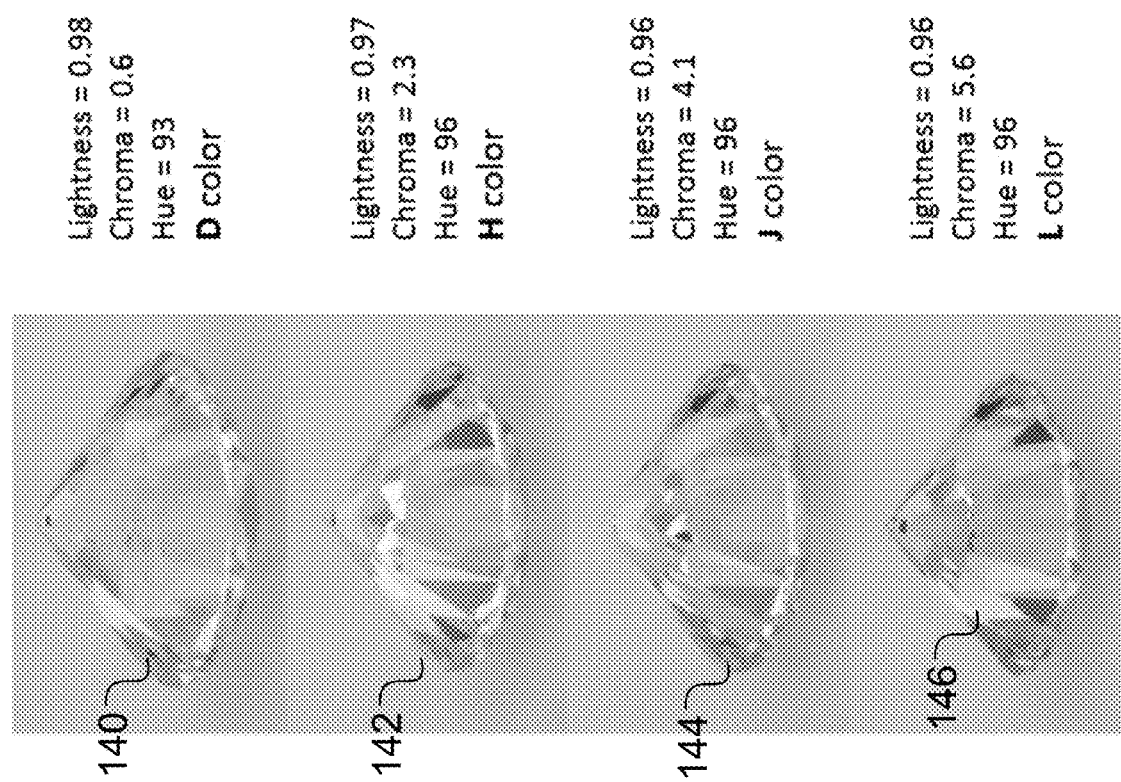
FIG. 1D are illustrations of samples and lightness, chroma, and hue examples under analysis according to certain aspects described herein.

To better help understand the correlation of color terminology with the visual appearance of diamonds, FIG. 1D shows color measurements on four stones 140, 142, 144, 146 with numerical values for Chroma, Lightness, and Hue. All of them are in the D to Z yellow hue range and Chroma measurements are indicative of the standard color grades D, H, J and L.

Figure 1E:
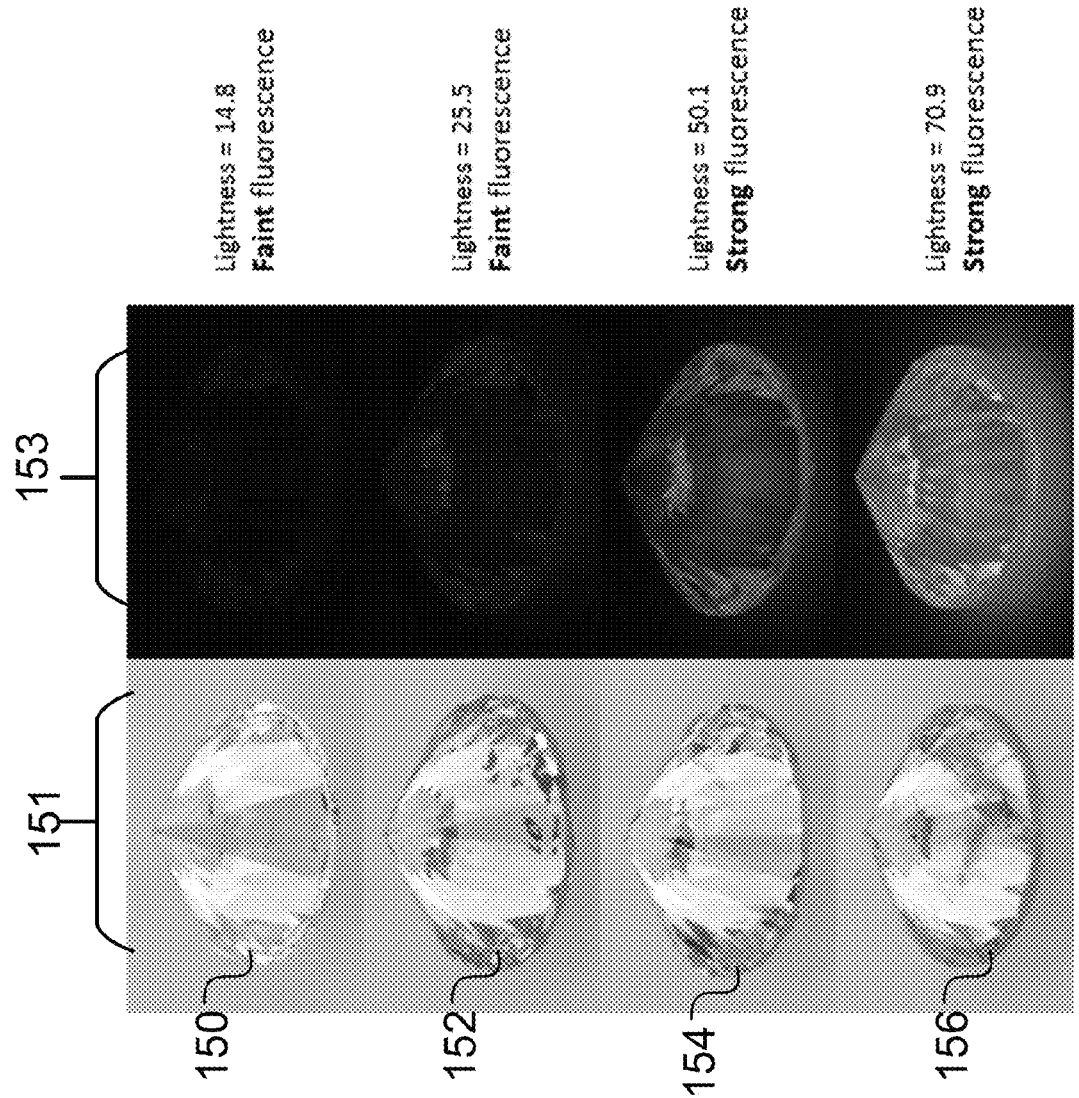
FIG. 1E are illustrations of samples and lightness, chroma, and hue examples with resulting fluorescence under analysis according to certain aspects described herein.

Fluorescence measurements show the correlation of fluorescence intensity and lightness. FIG. 1E shows four stones 150, 152, 154, 156, under normal white light 151 and UV light (365 nm) 153. Their blue fluorescence intensities 153 are reflected by the lightness measurement under the UV environment, which corresponded to faint and strong fluorescence descriptions. These are good examples to show that each fluorescence description covers a range of actual fluorescence intensities. Samples 150 and 152 are both described as having faint fluorescence, and samples 154 and 156 are reported as strong, despite the obvious differences in lightness and apparent fluorescence intensities. By tuning the UV intensity in the light used for analysis, color grade matching of VS stones in particular may be aided.

Whenever an object is viewed, the color seen is a result of the interaction of the light source and the object. When attempting to achieve an accurate and consistent color and fluorescence intensity evaluation, it may be useful to use a standardized lighting environment which may create reproducible measurement results that characterize color and fluorescence intensity in a quantitative way.

A light source is a real physical device that emits light with relative energy distribution in the visible spectrum (between about 380 nm to 750 nm wavelength) that can be turned on and off and used in visual color evaluation. The color temperature of a light source is the temperature of an ideal black-body radiator that radiates light of a color comparable to that of the light source expressed in kelvins (K). There are three common color temperature ranges: Warm Light (2700 K to 3000 K); Cool White (3000 K to 5000 K), and Daylight (5000 K to 6500 K).

An illuminant is an emission spectrum defined mathematically by a relative spectral power distribution that may or may not be physically realizable as a source. By International Commission on Illumination (CIE) definitions, commonly used illuminant A represents incandescent light from a tungsten filament, and the illuminant F series represents a range of fluorescent lamps. Both of them can be readily reproduced. The D series illuminants represent natural daylight and include D65, which refers to average noon-sky daylight with a correlated color temperature of approximately 6500 K, and D50, which typically refers to horizon daylight in the early morning or late afternoon with a correlated color temperature of approximately 5000 K. Unlike illuminant A and F series, the D series illuminants were defined as having specific Correlated Color Temperature, Chromaticity and Spectral Power Distribution, without corresponding standard light sources.

For the daylight analysis, sunlight at the earth's surface typically has between 3% and 5% UV component, thus a standardized daylight spectrum containing a UV component may help provide realistic, accurate, and consistent color and fluorescence intensity evaluations of diamond. In some examples, a 2% UV content light may be used as a standard for daylight approximating lighting conditions.

Some example lighting conditions that may be used, tuned, or preset in the systems here include a D65 condition with the addition of UV light. In some examples, 6500, 5000, 3200, 6500+UV at 365 nm may be used.

As an example, color temperatures between 6500 and 5000 may result in small differences, but lower temperature may lead to increase of Chroma and Hue for brownish stones. Choosing a specific UV intensity should improve the color grade matching of VS stones. Spectrum matching to D65/D50 significantly decreases Chroma of M/S/VS stones which is not desired for color grading consistency. For example, a VS stone shows an obvious chroma change depending on the UV difference between Halogen and Fluorescence lamps.

LEDs that generate Halogen lamp spectrums with higher UV matching to fluorescence lamps are desired and described herein.

Daylight Pavilion Example Analysis

Different imaging hardware arrangements may be used to measure the table-down and face-up color of diamond samples as described herein. A table-down color measurement system to image a stone pavilion may include a sample chamber with a rotational stage, a light integration hemisphere, a lens-camera assembly, and a light source with tunable UV content, shown for example as in FIG. 2A.

Figure 2A:
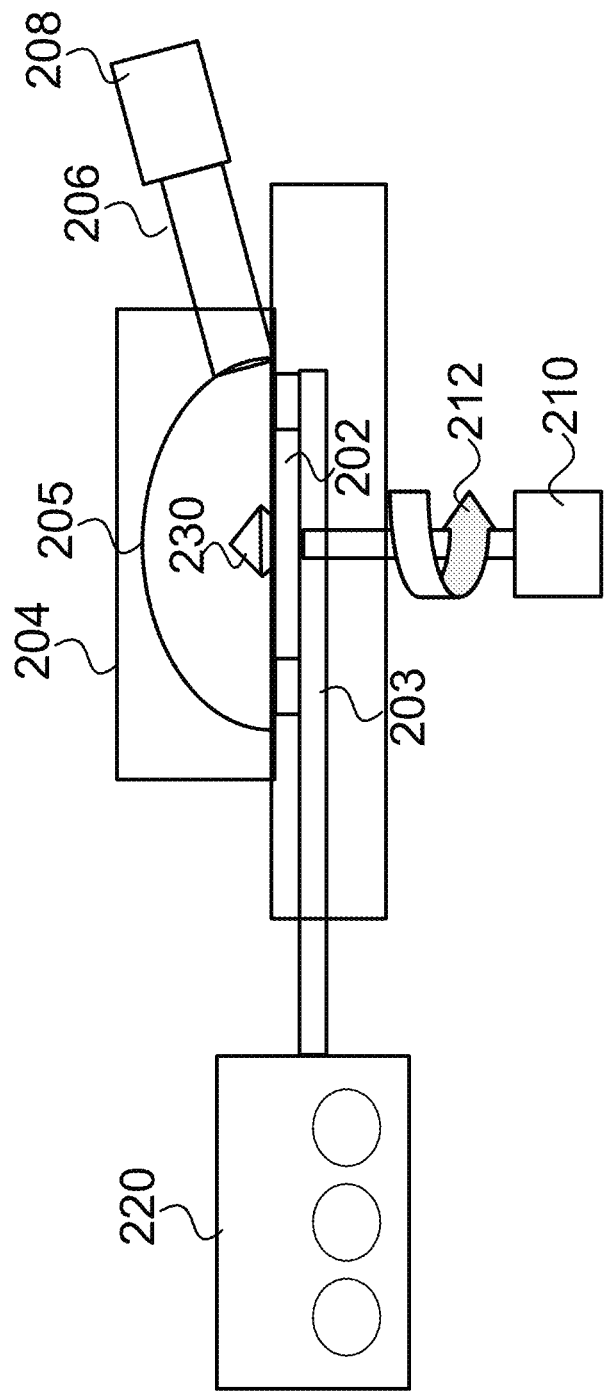
FIG. 2A is an illustration of an analysis system according to certain aspects described herein.

The example hardware arrangement shown in FIG. 2A allows for a gemstone to be simply placed on a rotational stage 202, for the camera to capture multiple angles of images, all under a clean, covered hemispherical top 204 with a hemispherical interior 205 enclosure that keeps out ambient light, and only allows in the light desired for analysis.

In some examples, the hemispherical top 204 with a hemispherical interior 205 may be hinged such that it may open and close on top of the stage 202. In some examples, a set of sliding rails may allow the hemispherical top 204 with a hemispherical interior 205 to open and close, providing access to the stage 202. In some examples, the stage 202 and/or top 204 are made of, or coated in Teflon and/or other white color material.

The system in the example includes a camera 208 with telecentric lens 206 which has access to the interior 205 of the hemispherical top 204. A sample gemstone 230 may be placed inside the example system, on the stage 202 and under the hemispherical top 204 closed over it either automatically by a motor, or manually, for analysis. In the example, the sample gemstone 230 is placed table down on the stage 202 such that the camera 208 and lens 206 may be used to capture images of the pavilion side while the gem is sitting table side down on the stage 202.

The example of FIG. 2A also includes a ring LED array 203 surrounding the bottom of the stage 202. In some examples, this ring of LED lights may surround an inner portion of the stage 202 such that the sample gemstone 230 may be placed within the ring of LEDs 203. In some examples, other arrangements of LED lights may be used such as but not limited to a grid of lights and a full covering of LED lights under the stage 202. In some examples, diffusers may be placed between the LED and stage 202 such that the LED light is diffused. The system shown includes an LED controller 220 in communication with the LED lights 203, which in some examples includes tunable UV adjusters. In such a way, the interior of the hemispherical top 205 and the stage 202 may be illuminated by the LED lights 203 around the stage 202 and tuned to adjust the UV in the LED lights. In some examples, the stage 202 may be connected to a stepper motor 210 or other kind of electric motor to rotate 212 the stage 202. In this way, the camera 208 may be able to capture images of the sample gemstone 230 on the stage 202 from any angle as the stage 202 rotates by the motor 210. Any of the above cameras, controllers, and/or motors may be in communication with, controlled by, or send and/or receive instructions to and from a computer system with processor and memory, or multiple computers as described in FIG. 19.

In some examples, the UV content of the light from the LEDs may be selectable among any of various options such as but not limited to UV intensity of 0%, 25%, 50% and 100% LED power with UV emission at 368 nm. Other examples include UV content adjustable from, for example 0%, 12%, 22%, and 70% in LED power with emission at 366 nm. Such example UV emissions may be tuned to the LED lights used in the example hardware arrangements described herein.

In some examples, a feedback loop may be established from the computer which is analyzing digital images sent from the camera using a spectrometer, to the LED controller 220 in communication with the LED lights 203, to adjust the output of UV in the LED lights 203. In such a system and method arrangement, the UV output of the LED lights may be adjusted by the computer while the system is analyzing the images, to change the UV intensity for subsequent images.

Figure 2B:
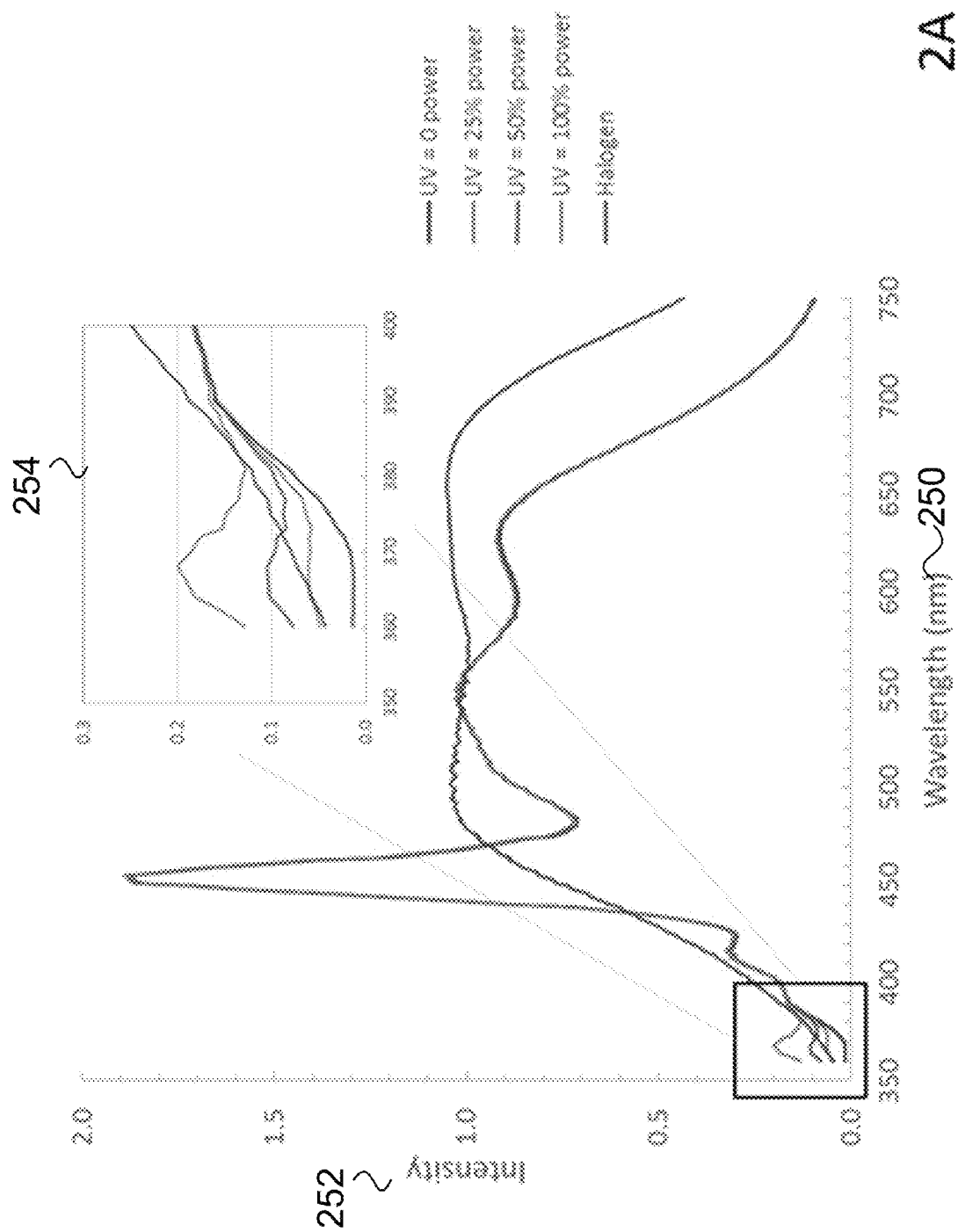
FIG. 2B is an illustration of analysis charts according to certain aspects described herein.

FIG. 2B shows a graph of table down color measurements taken of a sample gemstone placed in the hardware setup of FIG. 2A, together with LED light spectra at different UV intensities compared to a halogen light source with daylight filter. The x axis 250 shows Wavelength in nm and the y axis 252 shows Intensity. The detail 254 shows a close up of the x axis from 350 nm to 400 nm. The chart in FIG. 2B shows how the intensity changes over the range of UV powers and Halogen light source, over the Wavelength spectrum of 350 nm to 750 nm from a gem under analysis in the setup of FIG. 2A.

In the table-down measurement system, the numerical values of Lightness, Chroma, and Hue as described for example in FIGS. 1A-1E, may be used to characterize the effect of fluorescence on diamond table-down color in precise increments. Due to camera software differences, values for Hue, Saturation, and Brightness may be used in the face-up measurement system to correlate color grades and brightness of the stone with fluorescence.

Table 1 shows example analysis of polished diamond examples including four sets of round brilliant diamonds. Each set in the Table was arranged with the same color and similar sizes and proportions, but with different fluorescence intensities ranging from GIA descriptions of None to Very Strong. All samples were analyzed by ultraviolet/visible/near-infrared (UV-Vis-NIR), Fourier transform infrared (FTIR), and photoluminescence (PL) spectroscopy to provide additional information about the diamond type and atomic structural defects present. In addition, the birefringence of each sample in Table 1 was examined under crossed polarized light in a microscope to assess internal strain. Color and fluorescence intensity are characterized to correlate with the transparency and contrast examples.

| ID | SHAPE | COLOR | FL | WT | CUT | SYM | POLISH | TABLE | DEPTH | CA | PA | AGH |
|---|---|---|---|---|---|---|---|---|---|---|---|---|
| x0237 | Round | D | NON | 0.53 | EX | EX | EX | 58 | 61.3 | 33.6 | 41.3 | 3.4 |
| x4632 | Round | D | FNT | 0.61 | EX | EX | EX | 59 | 61.0 | 32.4 | 41.3 | 4.4 |
| x0517 | Round | D | MED | 0.74 | EX | EX | EX | 58 | 61.3 | 34.0 | 41.2 | 3.6 |
| x8912 | Round | D | STG | 0.61 | EX | EX | EX | 59 | 60.9 | 33.4 | 41.4 | 3.3 |
| x8789 | Round | D | VST | 0.63 | EX | EX | EX | 58 | 60.9 | 33.4 | 41.2 | 3.5 |
| x0059 | Round | F | NON | 0.56 | EX | EX | EX | 58 | 61.7 | 34.9 | 41.2 | 3.4 |
| x7519 | Round | F | FNT | 0.5 | EX | EX | EX | 57 | 61.7 | 34.7 | 41.4 | 2.8 |
| x8316 | Round | F | MED | 0.52 | EX | EX | EX | 58 | 61.9 | 34.5 | 41.3 | 3.5 |
| x7510 | Round | F | STG | 0.51 | EX | EX | EX | 58 | 61.9 | 34.6 | 41.3 | 3.3 |
| x8814 | Round | F | VST | 0.62 | EX | EX | EX | 58 | 61.6 | 34.2 | 41.3 | 3.5 |
| x2150 | Round | G | NON | 0.51 | EX | EX | EX | 57 | 62.1 | 34.5 | 41.2 | 3.6 |
| x2008 | Round | G | FNT | 0.52 | EX | EX | EX | 57 | 62.3 | 35.0 | 41.2 | 3.6 |
| x1977 | Round | G | MED | 0.41 | EX | EX | EX | 57 | 62.5 | 34.9 | 41.1 | 4.0 |
| x2109 | Round | G | STG | 0.51 | EX | EX | EX | 57 | 62.1 | 35.0 | 41.0 | 3.7 |
| x2356 | Round | G | VST | 0.5 | EX | EX | EX | 57 | 62.3 | 35.1 | 40.8 | 4.0 |
| x7596 | Round | H | NON | 0.53 | EX | EX | EX | 57 | 61.6 | 34.3 | 41.0 | 3.7 |
| x0271 | Round | H | FNT | 0.5 | EX | EX | EX | 57 | 61.5 | 34.0 | 41.3 | 3.3 |
| x7635 | Round | H | MED | 0.51 | EX | EX | EX | 57 | 61.3 | 33.7 | 41.0 | 3.4 |
| x8812 | Round | H | STG | 0.61 | EX | EX | EX | 58 | 61.2 | 33.9 | 41.2 | 3.5 |
| x8937 | Round | H | VST | 0.54 | EX | EX | EX | 57 | 61.4 | 34.4 | 41.0 | 3.4 |

Table Example Analysis

Figure 2C:
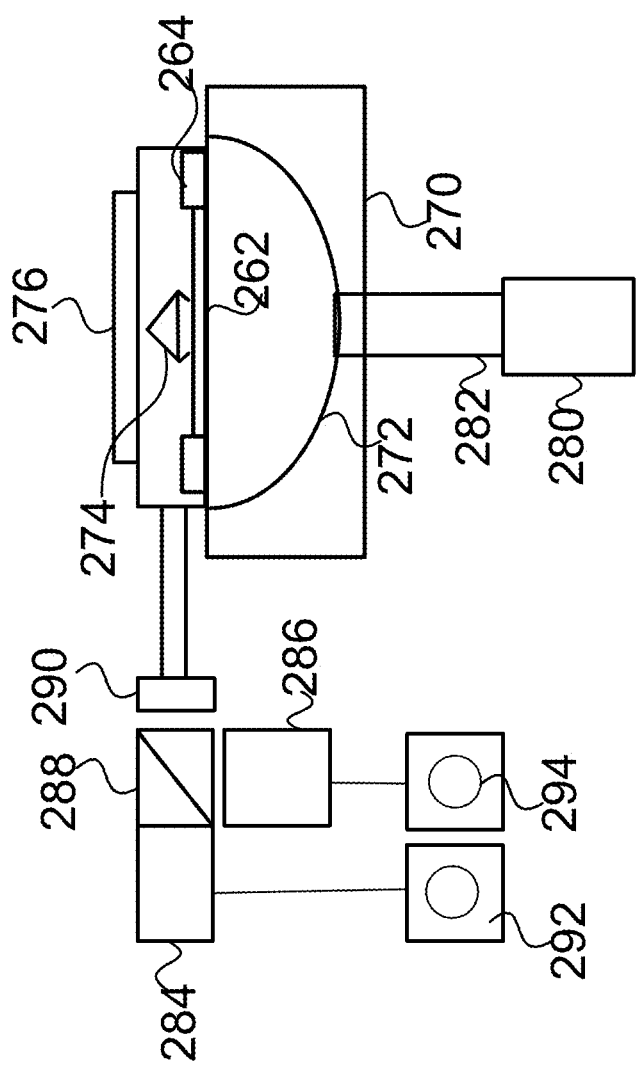
FIG. 2C is an illustration of an analysis system according to certain aspects described herein.

Another hardware setup, for table analysis is shown in FIG. 2C that includes a camera arranged to take images of the sample gemstone table for analysis. This arrangement overcomes the difficulty of imaging a gemstone table by eliminating the need to support the gemstone pavilion for analysis of the table. The example arrangement of FIG. 2C allows for ease of use by simply placing a stone, table side down, on a flat surface that is transparent. Then by imaging through the transparent stage, from the bottom, the gemstone table may be imaged and then another sample may be quickly replaced for additional quick sample analysis all under a clean covered enclosure that keeps out ambient light, and only allows in the light desired for analysis.

In use, a sample gemstone 274 may be placed table down on a glass or otherwise translucent or transparent stage 262. In some examples, other material may be used for the stage 262 instead of glass such as but not limited to sapphire, or any other kind of hard material that visible light may traverse. In the example, the stage 262 is surrounded by a fiber optic ring 264 of lights, or another arrangement of lights. In the example, the lights 264 are illuminating in a downward direction, into a bottom cover 270 that includes a hemispherical interior 272. The example shows a Teflon or other white material lid or cover 276 covering the stage 262 from the top to provide a clean backdrop for imaging from below. In such an arrangement, the sample gemstone 274 may be placed on the stage 262 table side down, and the lid 276 closed by hinge or slide rails to keep light out of the area of the stage 262 and hemispherical interior 272.

Through the hemispherical bottom cover 270, a camera 280 and lens 282 may be arranged. In such an arrangement, the camera 280 may be directed toward and through the stage 262 such that a sample gemstone 274 table may be imaged through the glass or otherwise translucent or transparent stage 262.

The example of FIG. 2C also includes an arrangement of lights such as a white LED 284 and UV LED 286 in communication with the fiber optic ring section 262 around the stage 262. In the example, the white LED is directed through a dichroic filter to allow the white light to travel through to the fiber optic ring 264. In the example, the UV LED is also directed toward the dichroic filter 288 and reflected to also or alternatively travel through to the fiber optic ring 264. In some examples, as shown, a diffuser 290 may be arranged between the dichroic filter 288 and the fiber line 264.

In the example shown, an LED controller 292 may be arranged to control the LED wavelengths of the white LED 284 and a separate controller is shown 294 in communication with the UV LED 286. In some examples, these LED controllers 292, 294 may be software enabled, in some examples, they may be hardware enabled, or a combination of both.

In such a way, the interior of the hemispherical bottom 272 and the stage 262 may be illuminated by the LED lights around the stage 262 and tuned to adjust the UV content in the LED lights. Any of the above cameras, controllers, etc. may be in communication with, controlled by, or send and/or receive instructions to and from a computer system with processor and memory, or multiple computers as described herein including FIG. 19.

As discussed above, a feedback loop may be established from the computer to the LED controller(s) 294 in communication with the LED lights 264, to adjust the output of UV 286 in the LED lights 264 to the camera 280 and/or spectrometer which sends wavelength data back to the computer. In such a system, the output of the LED lights may be adjusted while the system is confirming the wavelengths.

It should be noted that the light sources in FIGS. 2A and 2C may be the LED arrangement as described in FIG. 2A or the LED arrangement in communication with a fiber optic line as described in FIG. 2C, and/or the systems with the tunable UV lights as described. Any arrangement of light sources may be used in either table or pavilion analysis setups.

Figure 2D:
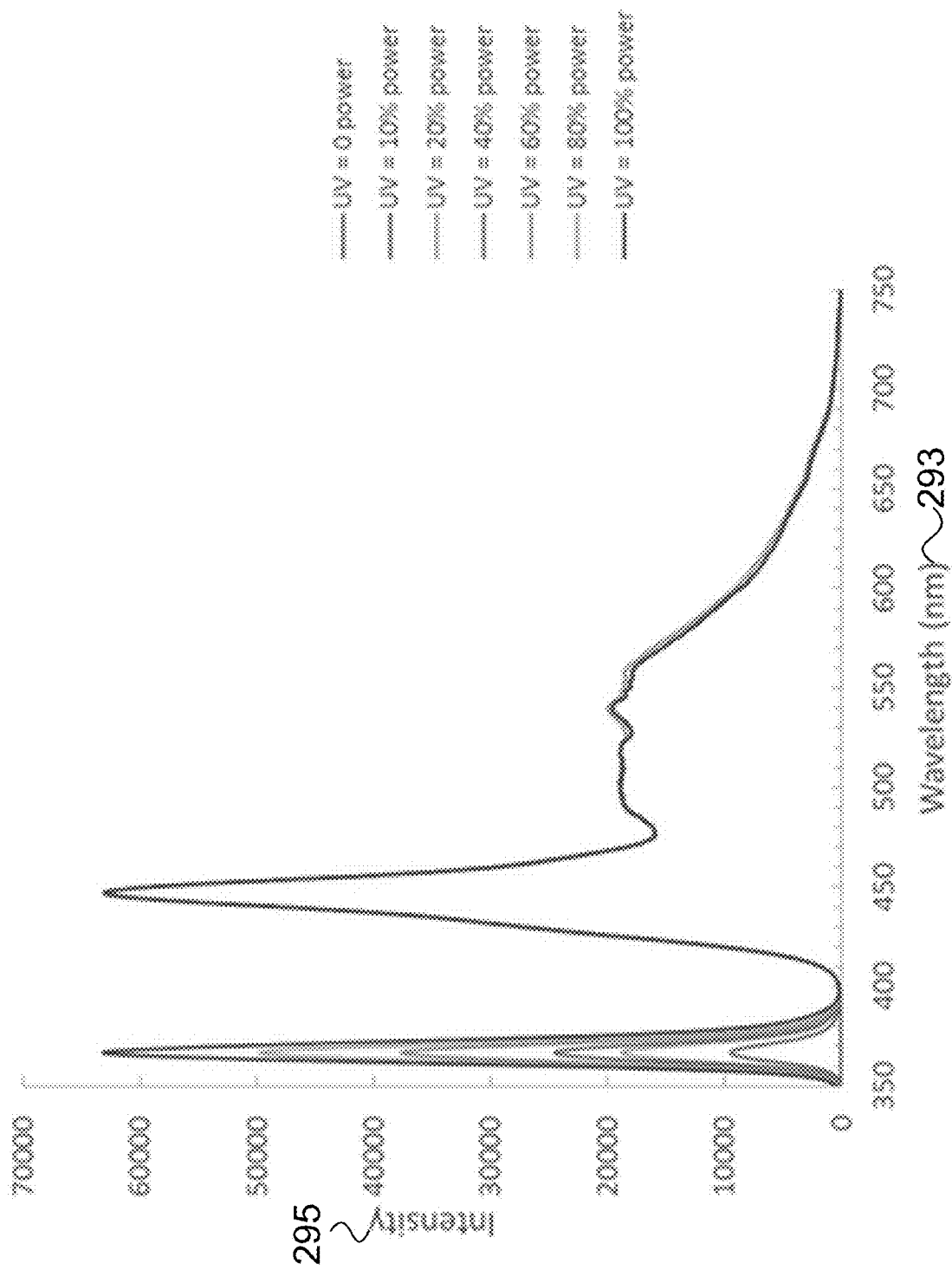
FIG. 2D is an illustration of analysis charts according to certain aspects described herein.

FIG. 2D shows a graph of table down color measurements taken of a sample gemstone placed in the setup of FIG. 2C, together with LED light spectra at different UV intensities. The x axis 293 shows Wavelength in nm and the y axis 295 shows Intensity. The chart in FIG. 2D shows how the intensity changes over the range of UV powers over the Wavelength spectrum of 350 nm to 750 nm from a face-up color measurement gem under analysis in the setup of FIG. 2C. It may be advantageous to capture and analyze images of gemstones taken under different UV intensities for grading purposes as described.

In some examples, FIG. 2D, the emission spectra from the light source may show four steps of UV intensity (0%, 25%, 50% and 100% LED power with UV emission at 368 nm). Such intensities may be used for incremental image capture and analysis of the same stone for comparison purposes. In some examples, such intensity steps may be programmed into the computer to change the UV intensities in the systems described in order to capture images at different UV intensities for analysis and/or grading purposes.

A face-up color measurement system as shown in FIG. 2C may be configured using a sample chamber, lens-camera assembly, and a light source with tunable UV content at four increments, for example 0%, 12%, 22%, and 70% in LED power with emission at 366 nm. Again, such incremental steps of UV content in the analysis light may be programmed into the computer to cause different UV content to be used for image capture. Such example UV emissions may be tuned to the LED lights used in the example hardware arrangements described herein.

Figure 2E:
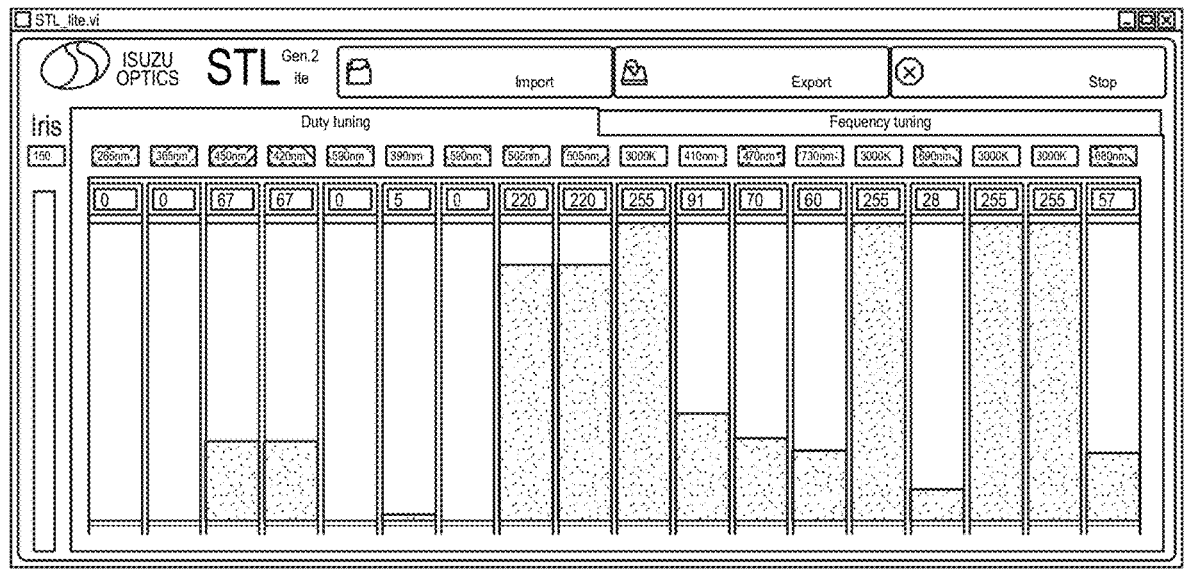
FIG. 2E is an illustration of analysis charts according to certain aspects described herein.
Figure 2E:
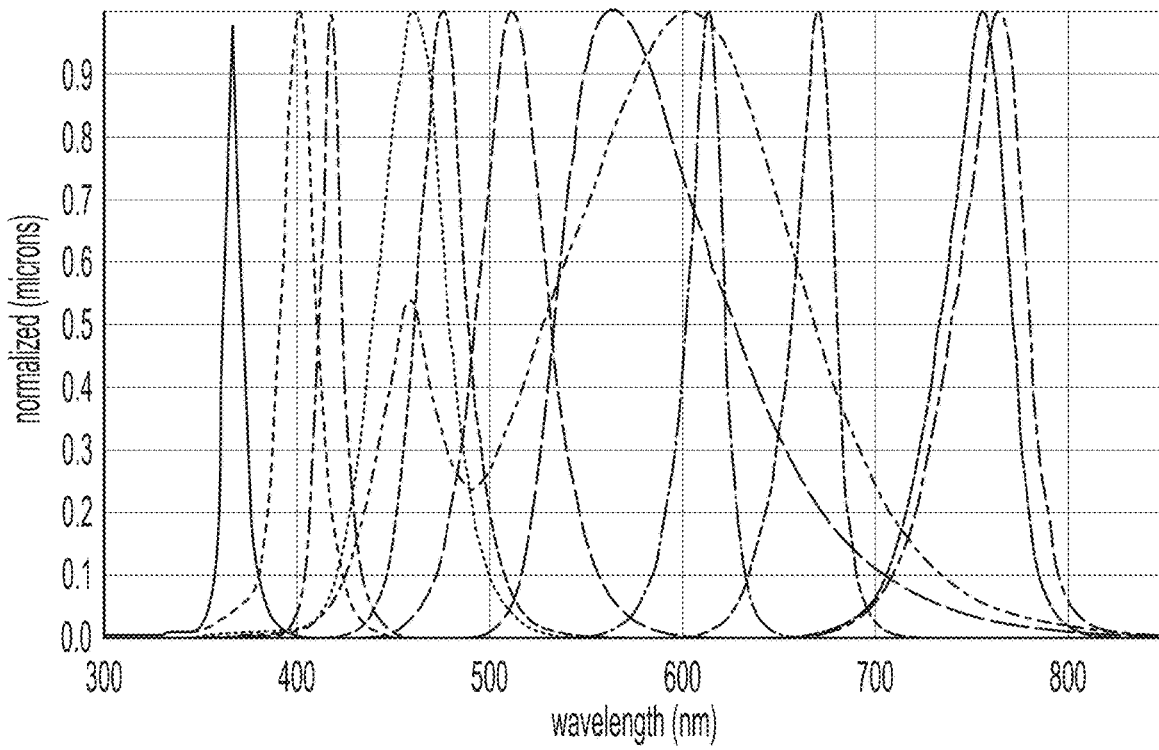

FIG. 2E shows examples of the development of tunable LED light source that can generate light spectrum of D65 and D50 with variable or programmable UV intensity. Such tuned LED lights may be used in either hardware arrangement of FIG. 2A or 2C or any other setup.

Figure 2F:
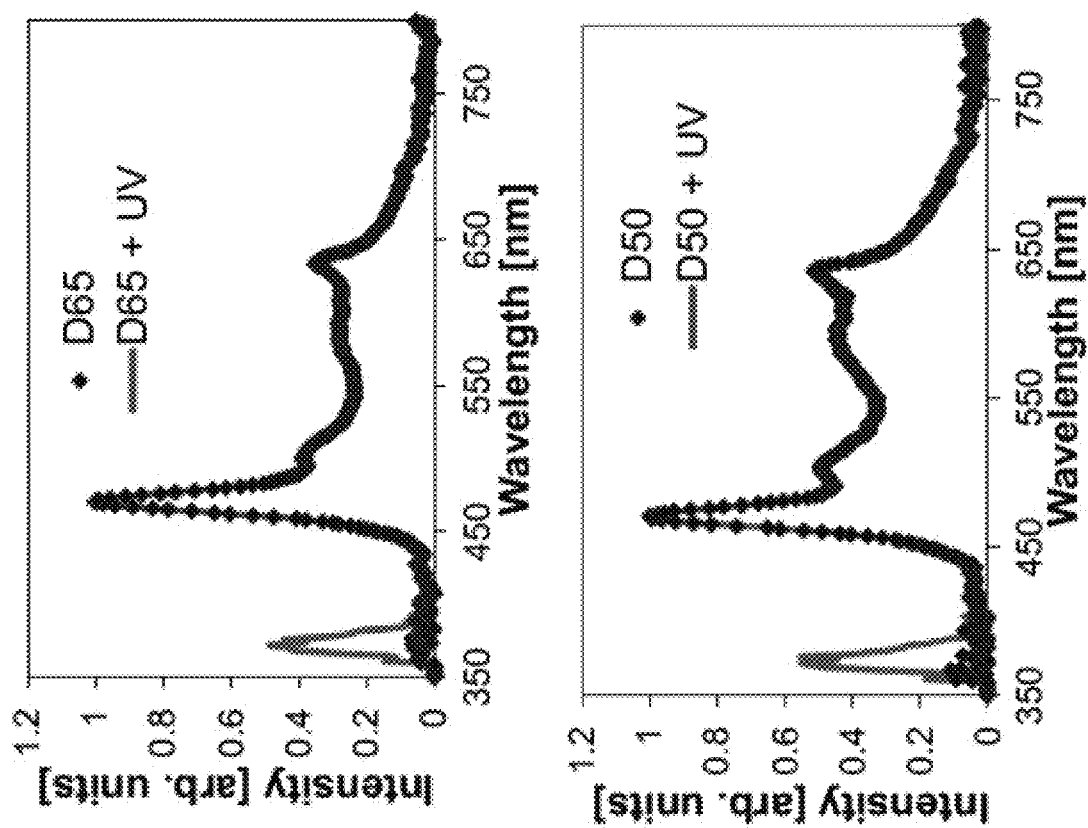
FIG. 2F is an illustration of a fluorescence measurement system according to certain aspects described herein.

Such tuned LED light sources may impact spectrum difference on color and clarity grading including absorption mapping of color centers, photochromic effect. The eighteen example LEDs in FIG. 2E have varying wavelength peaks and controlled by changing the relative intensities of, for example but not limited to 18 LEDs at, for example but not limited to temperatures of 6500K, 5000K, 3200K and 6500K+UV(@365 nm) as shown in FIG. 2F. The computer may be programmed to tune the light sources to change temperatures or to activate different LEDs in the systems to change the temperature of the light for analysis so that the camera may capture different images of a sample gemstone under different conditions for analysis and/or grading.

Again, in either hardware arrangement of FIG. 2A or 2C or any other setup, in some examples, one or multiple software pre-determined modes of tunable channels may be arranged such that an operator may simply select one of the predetermined modes for analysis. Such an arrangement of preset tuned LED programs would allow for quick analysis, and quick changes through the preset arrangements. Such a preset or progression through different presets could be automated by the system and the computers for sample analysis.

Table 2 shows example analysis or thirteen diamond plates sorted by the fluorescence intensity from low to high according to the lightness values from fluorescence measurements.

| Sample ID | Thickness (mm) | Lightness | Strain | Diamond Type |
|---|---|---|---|---|
| 5358_A | 1.709 | 3 | Medium | IaB |
| CBP-0368 | 4.314 | 3 | Strong | IaAB (low) |
| CBP-0069 | 2.205 | 6 | Medium | IaAB |
| CBP-0632 | 3.057 | 7 | Strong | iaAB |
| 5359_A | 0.876 | 12 | Medium | IaB |
| CBP-0413 | 2.661 | 37 | Weak | IaAB |
| CBP-0067 | 2.761 | 39 | None | IaAB |
| CBP-0098 | 2.225 | 43 | None | IaAB |
| CBP-0929 | 3.745 | 44 | Strong | IaB>A |
| CBP-0151 | 2.437 | 46 | None | IaAB |
| CBP-0033 | 2.768 | 47 | None | IaAB |
| CBP-0361 | 2.864 | 49 | Strong | IaB>A |
| CBP-0926 | 2.467 | 62 | Strong | IaB>A |

Fluorescence Analysis Examples

In some examples, it may be beneficial to assign a fluorescence score to a diamond. Such as score would quantify a detected fluorescence response to UV lighting. Such a score may be included in an automatic grading score arrangement as described herein.

Figure 3:
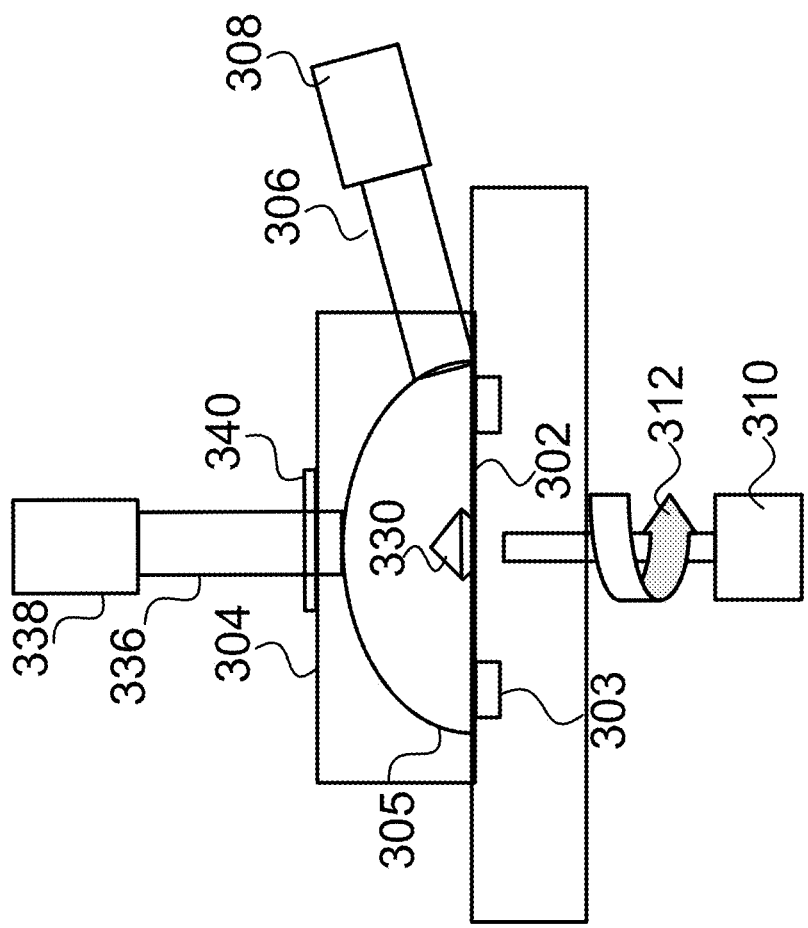
FIG. 3 is an illustration of analysis charts according to certain aspects described herein.

FIG. 3. shows yet an example fluorescence measurement analysis setup, similar to FIG. 2A but with different lighting arrangements. FIG. 3 shows a fluorescence measurement system that includes a sample chamber 305 with rotational stage 302, a lens camera assembly 308, 306, and a 365 nm UV-LED source 338, and lens 336 to measure fluorescence intensity of diamond or other gemstone samples as described herein. In the example, a rotating stage 302 may be surrounded by a top 304 with a hemispherical or semi-hemispherical interior 305. In some examples, the top 304 with a hemispherical interior 305 may be hinged such that it may open and close on top of the stage 302. In some examples, a set of sliding rails may allow the top 304 with a hemispherical interior 305 to open and close, providing access to the stage 302. In some examples, the stage 302 and/or top 304 are made of, or coated in Teflon and/or other white color material.

The system in the example includes a camera 308 with telecentric lens 306 which has access to the interior 305 of the hemispherical interior 305. A sample gemstone 330 may be placed inside the example system, on the stage 302 and under the top 304 for analysis. In the example, the sample gemstone 330 is placed table down on the stage 302 such that the camera 308 and lens 306 may be used to capture images of the pavilion side while the gem is sitting table side down on the stage 302.

The example of FIG. 3 also includes a UV LED 338 and lens 336 arrangement configured to direct light onto the top of the pavilion of the gemstone 330 sample on the stage 302. In some examples, a shutter 340 may be used between the lens 336 and interior chamber 305. In such examples, the shutter 340 may be opened and closed by computer in synchronization with the camera 308 as required for analysis.

The example of FIG. 3 also includes a ring LED array 303 surrounding the bottom of the stage 302. In some examples, this ring of LED lights may surround an inner portion of the stage 302 such that the sample gemstone 330 may be placed within the ring of LEDs 303. In some examples, other arrangements of LED lights may be used such as but not limited to a grid of lights and a full covering of LED lights under the stage 302 or fiber optic lights directing light from a source light. In some examples, diffusers may be placed between the LED and stage 302 such that the LED light is diffused. The system shown does not include an LED controller in communication with the LED lights 303, but in some examples, may be arranged for tunable UV adjusters as described in FIG. 2A and FIG. 2C. In such a way, the interior of the hemispherical top 305 and the stage 302 may be illuminated by the LED lights 303 around the stage 302 and tuned to adjust the UV in the LED lights. In some examples, the stage 302 may be connected to a stepper motor 310 or other kind of electric motor to rotate 312 the stage 302. In this way, the camera 308 may be able to capture images of the sample gemstone 330 on the stage 302 from any angle as the stage 302 rotates by the motor 310. Any of the above cameras, controllers, and/or motors may be in communication with, controlled by, or send and/or receive instructions to and from a computer system with processor and memory, or multiple computers as described in FIG. 19.

The arrangement of FIG. 3 may be used to take digital images of a diamond under UV lighting conditions and thereby obtain images to that may be analyzed to determine a fluorescence score of the sample diamond. Pixel analysis of each image taken under UV lighting conditions may be analyzed for brightness as described herein, and a fluorescence score may be assigned to each sample after multiple images are taken and analyzed as described.

Darkfield Analysis

A dark-field imaging system was designed to produce images of diamonds which represent the way diamonds would be viewed during diamond grading. The system may include any number of components, such as but not limited to a Nikon D800E, Nikon SB-900 Speedlight, Sigma 150 mm macro lens, Stackshot macro rail package, and custom mounting fixtures. Software to control the camera and Stackshot hardware may be used to automatically capture and stack a series of images for each diamond through a range of focal planes. The final processed images are used to evaluate the face-up appearance of diamonds.

Figure 4A:
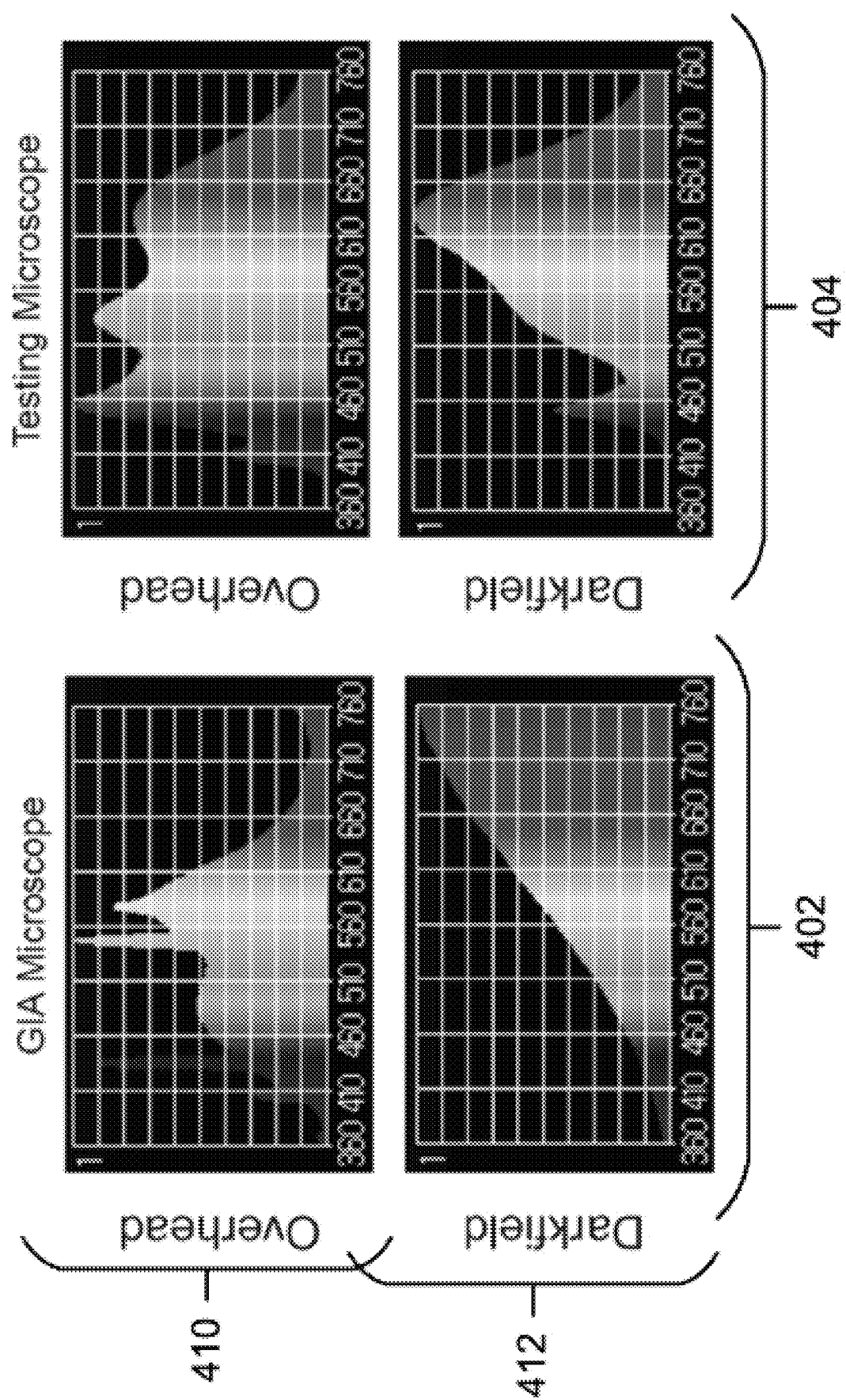
FIG. 4A is an illustration of analysis charts according to certain aspects described herein.

FIG. 4A shows example charts of light spectra collected from a microscope 402 overhead lamp 410 and darkfield illumination 412 in a recessed light chamber. The charts show that both contain UV component on the left of each chart. For comparison, spectra from a testing microscope 404 with no UV component in either overhead lamp 410 or darkfield illumination 412 are shown to the right.

The example includes two different microscopes to help understand the effect of blue fluorescence on diamond appearance under magnification. As shown in FIG. 4A, the first microscope 402 had UV component in both the overhead lamp 410 and from the halogen bulb in the recessed light chamber used for darkfield illumination 412. The other testing microscope 404 has no UV peak but wavelengths between 400 nm and 420 nm in the overhead lamp 410. The darkfield illumination 412 of this testing microscope 404 contained absolutely no UV or observable wavelengths below 420 nm under (i.e., it was completely free of UV component).

Transparency Measurement Examples

As discussed here, the term Transparency may refer to the degree of regular transmission, thus the property of a material by which objects may be seen through it. And Haze may be the scattering of light by a specimen responsible for the apparent reduction in contrast of objects viewed thought it. Clarity may also be used to describe transparency herein.

The Modulation Transfer Function (MTF) measurement system was configured using a sample chamber, lens-camera assembly, a light source with tunable UV content, and a microslide with sinusoidal array as shown in FIGS. 2A and 2C. The MTF measurement system uses image processing technology to produce percent contrast values from the sinusoidal array target. Below explains how MTF can be used to assess diamond transparency.

Figure 4B:
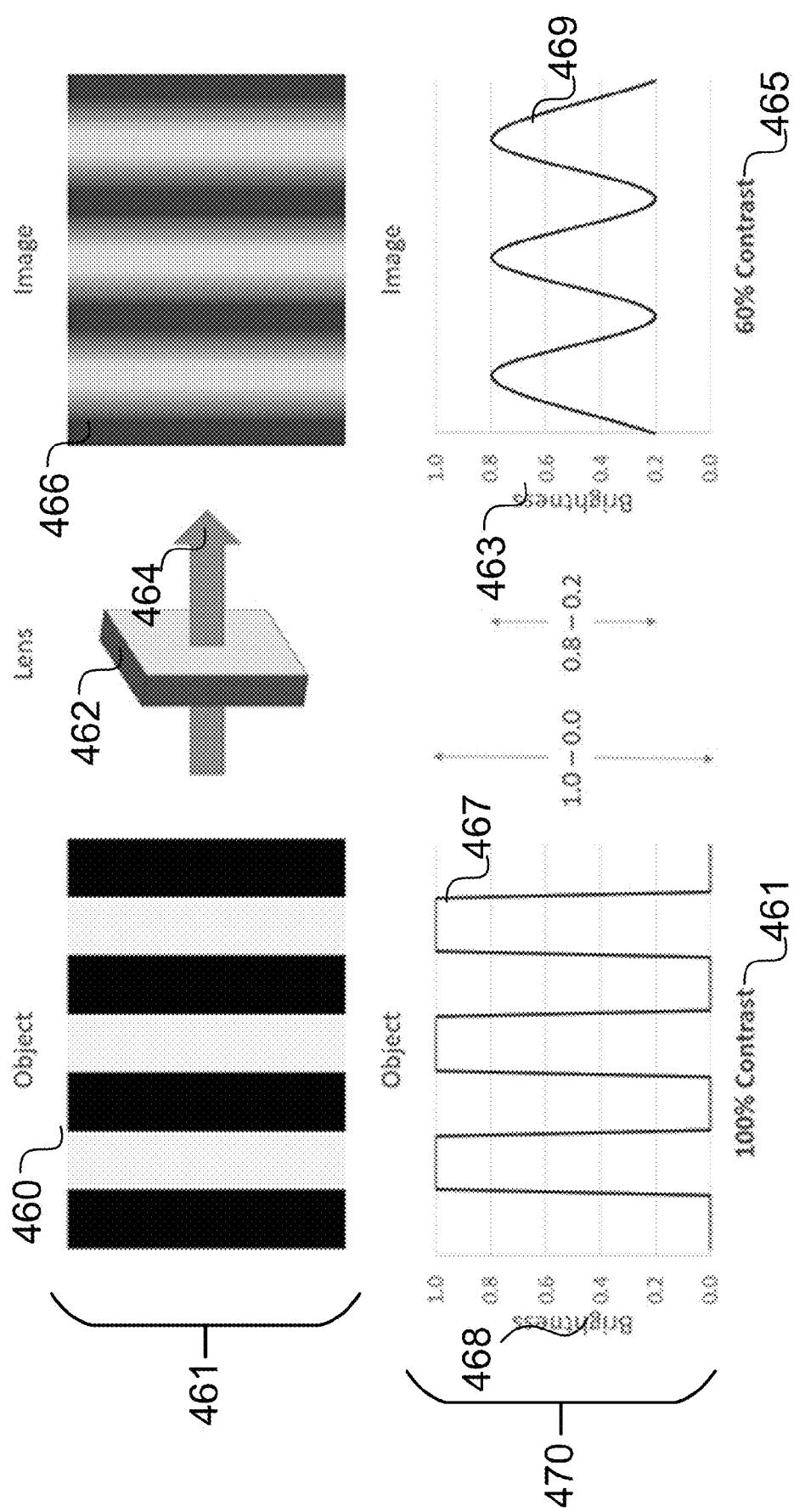
FIG. 4B includes illustrations of an object imaged through a lens shown to have reduced contrast and resolution under analysis according to certain aspects described herein.

In optical science, modulation transfer function (MTF) may be used to measure the ability of an optical component to transfer contrast at a given resolution—optical transparency. Optical components, a lens for example, can cause resolution and contrast to be reduced, shown for example in FIG. 4B, 461, when used in an optical system. FIG. 4B top 461 shows an example object 460 imaged 466 through 464 a lens 462 is shown to have reduced contrast and resolution. This effect can be characterized by first measuring brightness 468 across a series of equally spaced, alternating black and white lines 467 imaged through the lens, or as in this case, through a diamond 483 for analyzing the haziness or transparency of the diamond 483 itself shown for example in FIG. 4B Lower 470, and, in this context, calculate contrast 461, 465 as the difference in brightness 468, 463 between the black and white line 467, 469, shown for example in FIG.

4C. FIG. 4C shows a light 472 and dark 474 chart plotting 478 the images as described above and determining contrast 476. FIG. 4C.

Contrast 476 may be calculated as:

% Contrast=[(Imax−Imin)/(Imax+Imin)]×100

By comparing this contrast measurement 478 to a maximum measurable contrast, using the formula above, a percent contrast may be determined. Percent contrast measurements using a range of line-pair frequencies describe the transparency of the lens. Evaluating the transparency of diamond plates with different fluorescence intensities under lighting environments with and without UV may be made. For example, an optical target from Edmund Optics with line-pair frequencies ranging from 2 line pairs/mm to 256 line pairs/mm (line pairs per millimeter) may be used.

MTF to Measure Transparency of Diamond Plates

Figure 4D:
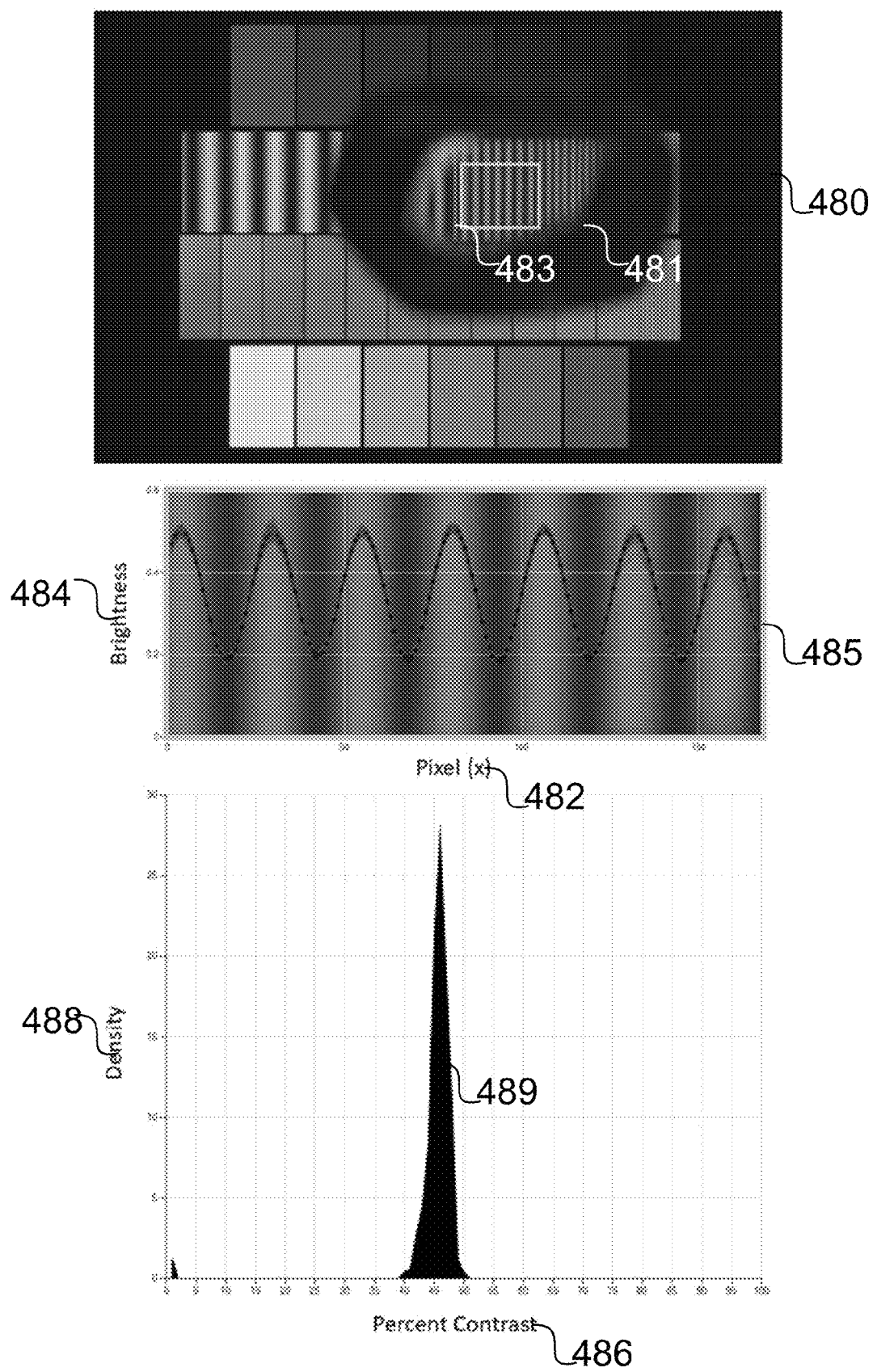
FIG. 4D includes illustrations of charts imaged through a diamond plate to conduct MTF measurements.

FIG. 4D shows examples that allow MTF to be used to measure the transparency of diamond plates 481. In the example, diamond plates 481 are placed between a lens-camera assembly such as FIG. 2A or 2C and an optical target such as shown as differently spaced groupings of black and white lines 480 in FIG. 4D as gray scale gradients. An image 4D may be captured and cropped 483 to include only one subset of the overall image 480 designated as an area of interest. A software application or program may receive such a digital image such as that shown in FIG. 4D top 480 and the software may calculate an average brightness value for each column of pixels in the image 480 (or within the area of interest 483) and use those values to identify locations of a series of local maxima and minima which correspond to the location of line-pairs in the optical target as shown in FIG. 4D, showing chart 485 which is a stretched out, zoomed in detail of the selected area of interest 483 and a superimposed waveform line of Pixels (on an x axis) 482 and Brightness (on a y axis) 484. Such a chart may indicate, by observing the superimposed waveform line, the highest brightness pixels at the peaks of the line and darkest brightness pixels at the troughs of the line as percent contrast between the lines. This waveform may be automatically accomplished by software analyzing the pixelated image.

This method may be repeated on the differently spaced about black and white lines in the target 480 and different areas of interest 483 may be captured through the diamond 481 to gain multiple charts and graphs of the different line spacings on the target. Examples include but are not limited to two pairs of black and white lines per millimeter and incrementally getting smaller until 64 line pair groups per millimeter. Other spacings could be used, these are merely examples.

The software may be used to analyze a select areas 483 of the image in succession, and determine the percent contrast value 489 as described herein and shown in FIG. 4D bottom as a chart of percent contrast (x) 486 and Density (y) 488. Brightness values 488 at these locations may be paired together across each row of pixels and their differences in value are assembled into a density plot 489 to observe their distribution, for example FIG. 4D, bottom. The average value in the data set may be used to calculate the normalized percent contrast for that target.

Patterns of bright and dark areas produced by light interacting with the facets of a polished diamond may create a mechanism by which systems and methods here may determine the transparency of that diamond. When a diamond is very transparent these patterns are perceived to be high in contrast, while for less transparent stones the perceived contrast is reduced—dark areas are less dark, and/or bright areas may be perceived as less bright. In such examples, the differences in the distance of brightness between the troughs and peaks, may be used to determine a number that may equate to a transparency, or haziness grade. Such a grade may be determined by comparing the difference between the peaks and troughs with a look up table of pre-determined numbers. In such a way, a diamond may be automatically graded for transparency or haziness.

Figure 5:
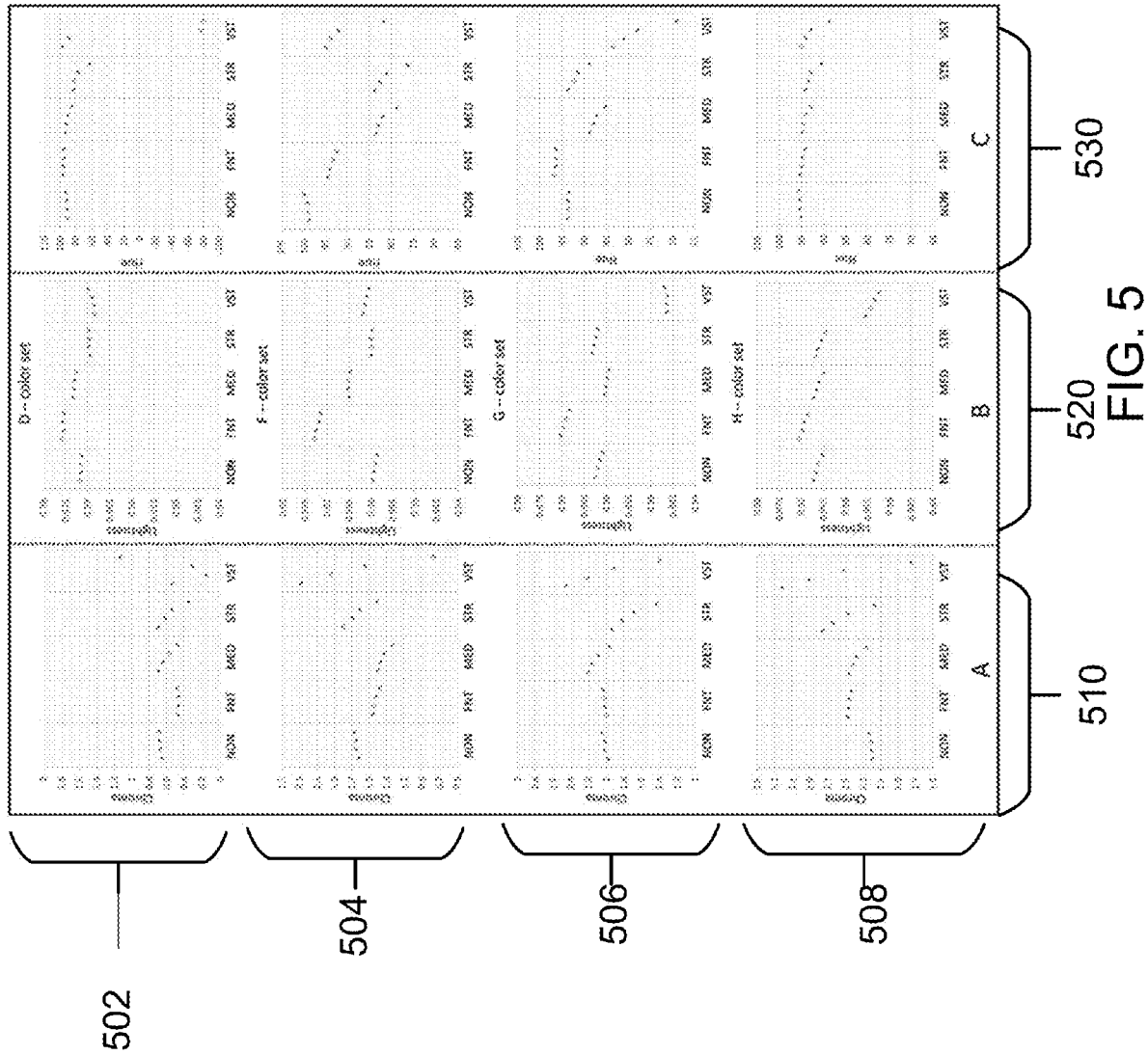
FIG. 5 is an illustration of analysis charts according to certain aspects described herein.

FIG. 5 shows example plots of Chroma across different color sets of diamonds. Trends of Chroma, Lightness, and Hue can be seen under different UV intensities measured on the table-down color measurement system on D, F, G, and H color sample sets. The four consecutive data points in each color and fluorescence grade represent data collected at the incremented UV content of 0%, 5%, 9% and 17%.

Similarly sized diamonds comprising a cross section of color grades and fluorescence descriptions were measured on the table-down color measurement system and describe in Table 1. Each sample was measured under the same lighting environment with UV content incremented to 0%, 5%, 9%, and 17% at 368 nm (percent of UV content relative to total light). FIG. 5 left column A 510 shows the way Chroma values change with different UV intensities for D 502, F 504, G 506, and H-color 508 diamonds with None, Faint, Medium, Strong, and Very Strong fluorescence descriptions. Diamonds with None or Faint fluorescence show negligible difference in Chroma values as the UV content increases. Diamonds with Medium fluorescence start to show a slight decrease in Chroma values as the UV content increases. Diamonds with Strong or Very Strong fluorescence descriptions show obvious reductions in Chroma values as UV content increases. The color can change much as two color grades for diamonds with Very Strong fluorescence as UV content increases from 0% to 17%. The D-color diamond with Very Strong fluorescence shows a sharp reduction in Chroma between 0% and 5% UV content followed by a sharp increase in Chroma as the UV content increases to 9% and 17%. The reduction in Chroma corresponds to a desaturation of yellow body color as it becomes neutralized by blue fluorescence, that is, the increase in Chroma is caused by the fluorescence emission which begins to dominate the body color and shifts the hue from yellow towards blue.

FIG. 5 middle column B 520 and 5 right column C 530 show the way Lightness and Hue values for these diamonds change under different UV intensities. For lightness, D and F-color diamonds do not show an obvious change as the UV content increased, whereas G and H-color diamonds all show a consistent decrease in lightness values across every fluorescence description. Diamonds with None or Faint fluorescence show negligible changes in Hue values as the UV content increases. Diamonds with Medium fluorescence start to show some change in Hue value as the UV content increases, and diamonds with Strong or Very Strong fluorescence show sharp changes in Hue value as the UV content increases. The D-color diamond with Very Strong fluorescence shows a large change in Hue, from 100 to −80, as the UV content increases to 9%. This jump is attributed to a change in Hue from yellow to blue.

Figure 6:
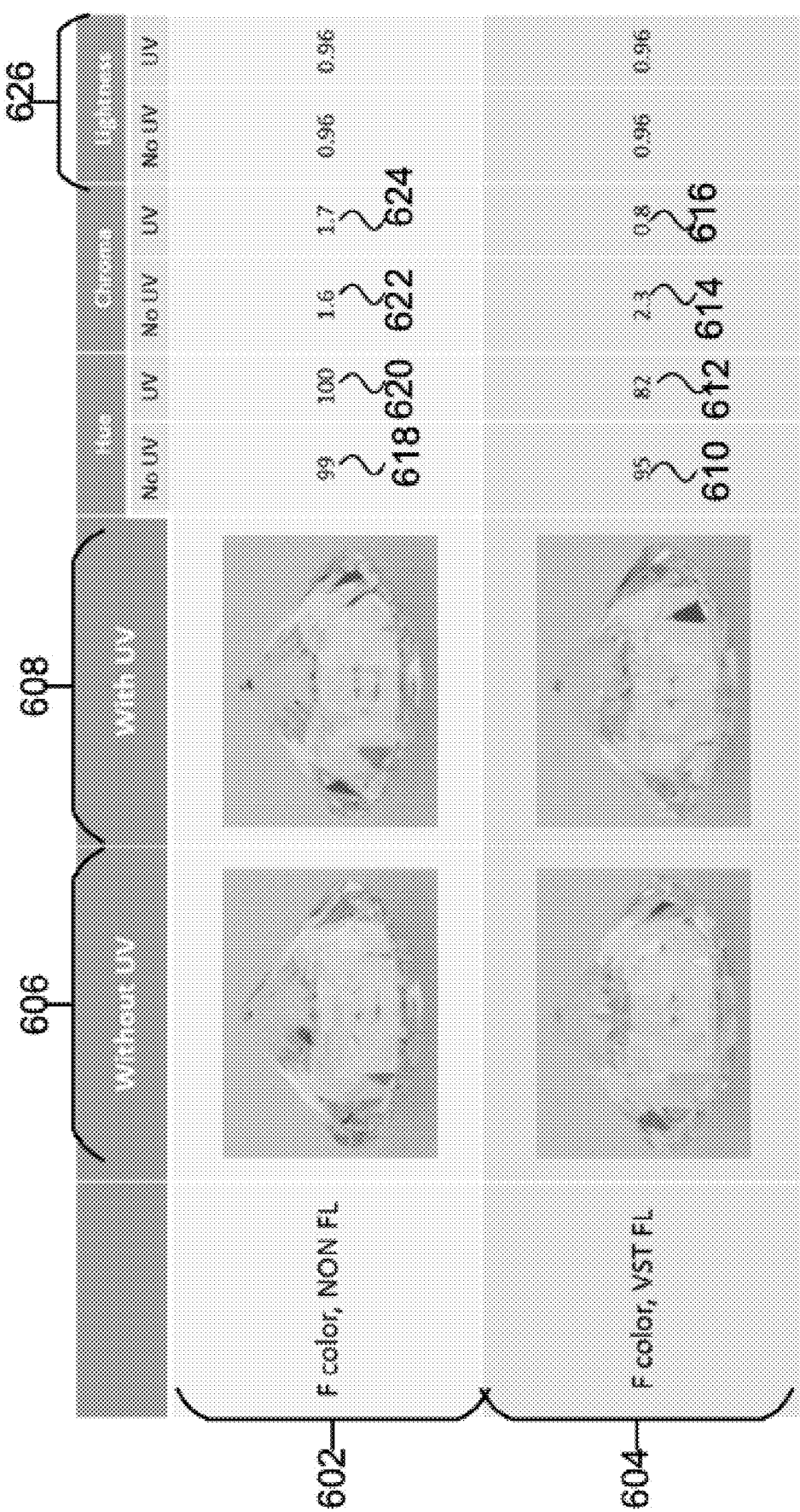
FIG. 6 is an illustration of analysis charts according to certain aspects described herein.

As shown in FIG. 6. the None 602 and Very strong 604 fluorescence stones in the F color set are seen here under no UV 606 and high UV 608 intensities from the table-down color measurement system along with corresponding attributes.

The diamonds in the F-color set with None 602 and Very Strong 604 fluorescence are shown in FIG. 6 in the lighting environments with no UV content (0%) 606 and with relatively high UV content (17%) 608 when table-down color measurements were made. There is no obvious color change in the diamond with a None fluorescence description which may add UV to the lighting environment. Hue angle moved from 99, 618 to 100×, 620 and Chroma moved from 1.6, 622 to 1.7, 624. Lightness 626 did not change for either. In contrast, the diamond with Very Strong fluorescence 604 shows a de-saturated body color as UV 608 is added to the lighting environment. This demonstrates the way blue fluorescence can neutralize a yellow body color in some diamonds by the complementary color principle. For example, the Hue angle moved from normal yellow (95 degrees) 610 to blue (82 degrees) 612 and the Chroma value decreased from 2.3 614 to 0.8 616.

Face-Up Color And Brightness

Turning again to Table 1, which shows face-up images of diamonds with a range of fluorescence descriptions were collected using light with incrementally increased UV content. An area in each image near the center of the diamond was selected for measurement, and the average hue, saturation, and brightness for the array of pixels comprising the selected area was calculated for each image. A face-up color of a diamond may be affected by the pattern and reflections from light return, which depend mainly on cutting parameters so the quantified hue, saturation, and brightness values in this process are not comparable to the body color derived from the table-down color measurement system. However, using the stone with a None fluorescence description in each color grade as the baseline, the resulting values may be compared to the level of UV content for the related images to examine the effect of UV on the face-up color and appearance of diamonds with different fluorescence descriptions.

The color of diamonds with weak or no fluorescence is shown to be unaffected by UV, while the color of diamonds with stronger fluorescence is systematically altered. The none and very strong fluorescence stones in the F color set from the face-up imaging system show that for diamonds with little to no fluorescence, the color and appearance does not change with the addition of UV, but for diamonds with fluorescence, the addition of UV causes the Hue and Brightness values to increase and saturation to decrease. This makes sense if the mechanism of fluorescence converted invisible UV light into visible light, thereby increasing the observed light return. Saturation values for diamonds with fluorescence are reduced with exposure to UV as the blue fluorescence neutralizes their normally yellow hue. However, if the measured Hue changed from yellow to blue range, a slight increase in Saturation with increasing UV, shown for example at FIG. 7, bottom, may be observed. Results suggest that the strongly fluorescent diamonds were perceived to have a better color appearance when viewed face-up.

Figure 7:
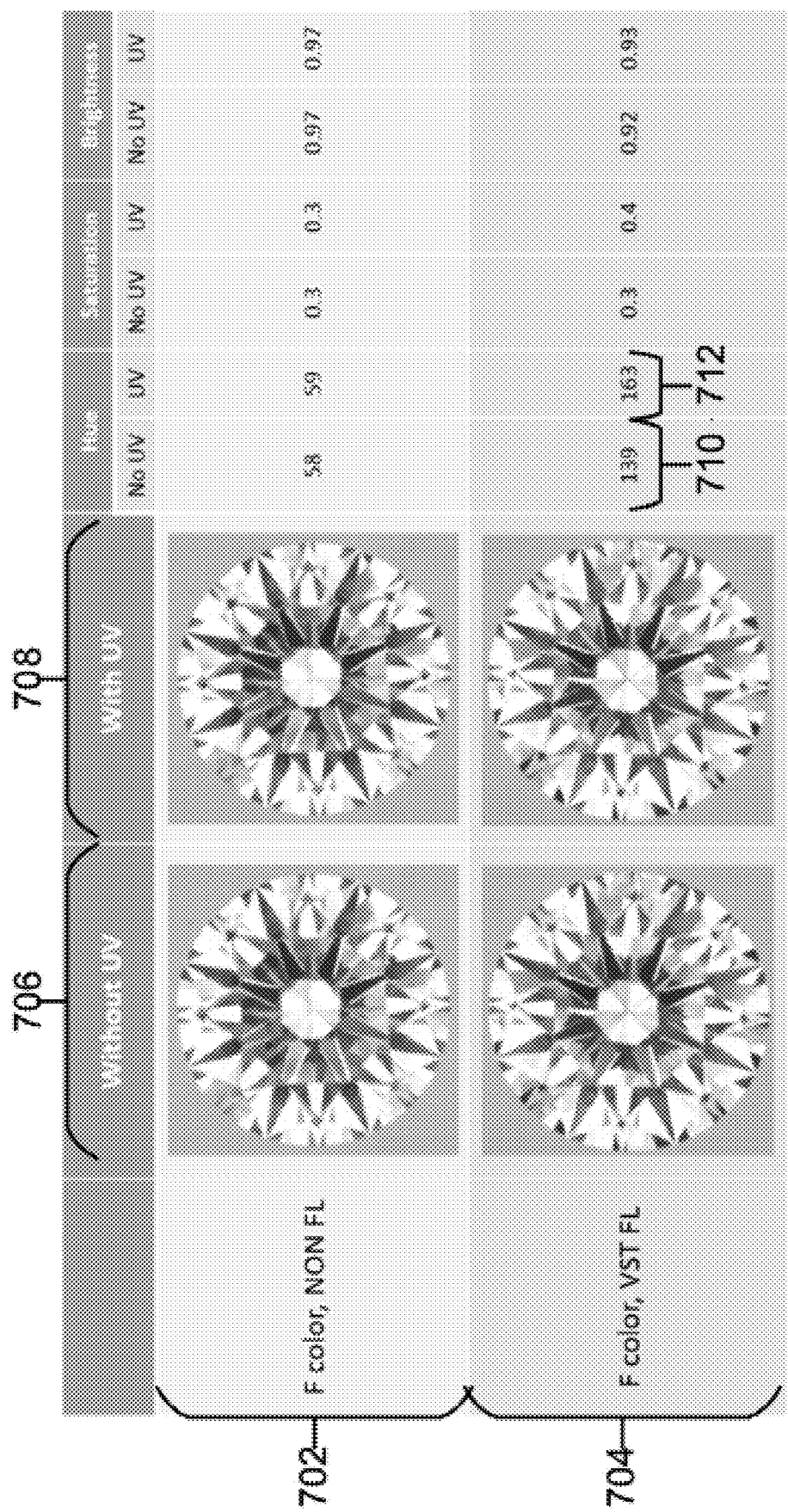
FIG. 7 is an illustration of analysis charts according to certain aspects described herein.

FIG. 7. is a face up example of FIG. 6 showing the None or non-fluorescence stone 702 and Very strong fluorescence stone 704 examples in the F color set are seen here under no UV 706 and maximum UV 708 intensities from the face-up imaging system along with corresponding attributes, including the hue difference between the no UV 139, 710 and UV 163, 712 for the Very strong fluorescence stone 704.

Blue Fluorescence Effect on Transparency

Systems and methods described herein may be used to identify diamonds where the inherent fluorescence qualities result in reduced transparency. This may be accomplished by determining both a clarity/haziness score and a fluorescence score. The hardware analysis examples of FIGS. 2A, 2C and 3 may be used to capture images of gemstones under different lighting conditions, and from different angles as described for analysis as described herein. Such cameras and lighting systems may be arranged in communication with or include a computing system (such as the example in FIG. 19). By capturing images of gemstones with the digital cameras and lighting conditions as described, pixelated digital images may be captured and analyzed as described herein.

In combination with any example described herein, it may be useful to combine a blue fluorescence score with a clarity score to determine whether, for a particular diamond, the fluorescence qualities of that gemstone affect transparency or not. Thus, determining both a fluorescence score and a clarity score for each stone may be useful.

Figure 8:
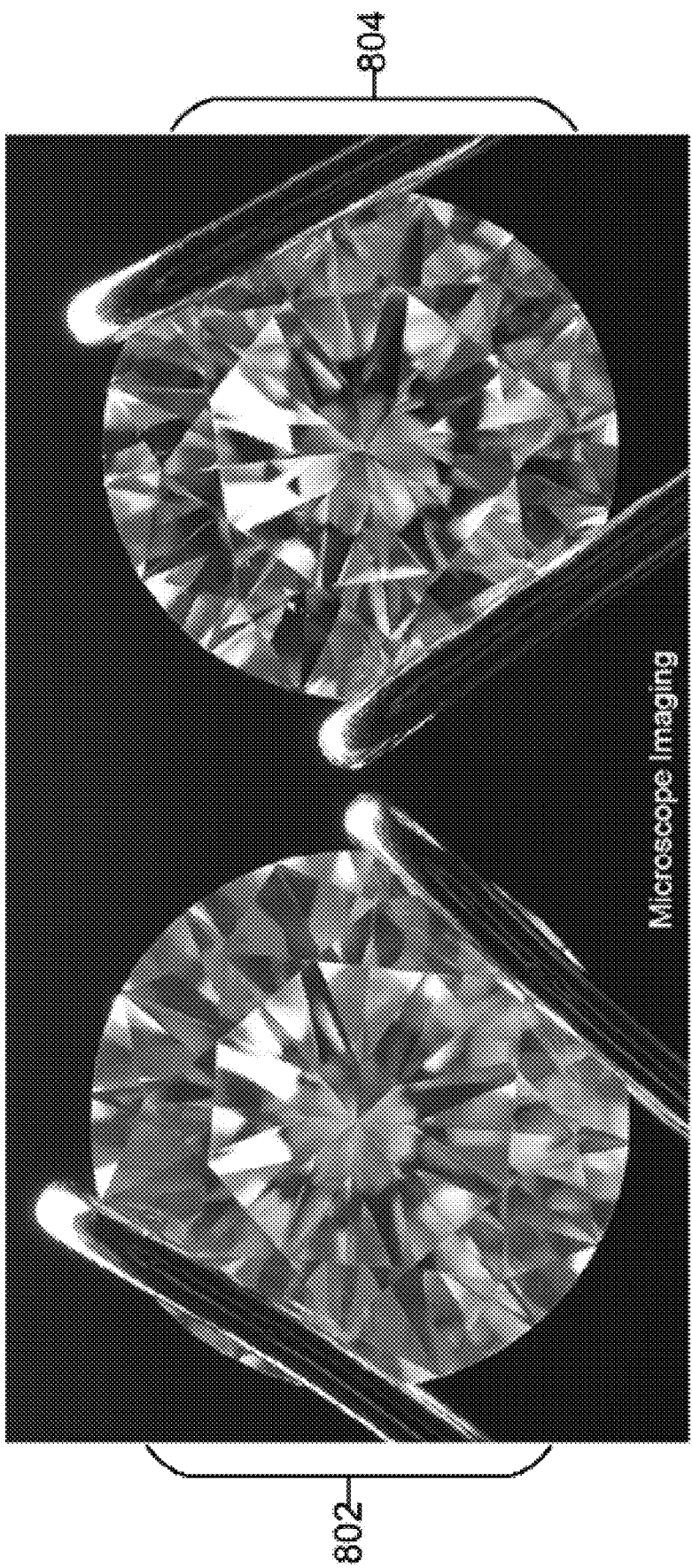
FIG. 8 is an illustration of microscope imaging of haziness examples, under analysis according to certain aspects described herein.

FIG. 8. shows another example of a stone with none or no fluorescence 804 and very strong fluorescence 802 stones in the D color set, which are shown in FIG. 8 under the same microscope setup for transparency evaluation.

As can be seen in FIG. 8 of the D color diamond with very strong fluorescence 802 compared with a D color diamond with no fluorescence 804 under the same lighting condition (samples from D color set in Table 1), even with the same color grade and similar proportions, the diamond with Very Strong fluorescence 802 appears slightly more milky white than the diamond with no fluorescence 804. The pattern of the diamond with Very Strong fluorescence 802 also looks softer than the pattern in the diamond with no fluorescence 804, which appears very crisp and sharp.

As shown, a diamond with no fluorescence may exhibit a very distinct pattern with sharp boundaries between dark and light areas (FIG. 8, 804 right) created by the facet arrangement. If this pattern appears in a diamond with very strong fluorescence, in a lighting environment with some UV content (FIG. 8, 802 left), the fluorescence may make the stone brighter, however, because the dark areas are less dark and the light areas gain a blue hue due to the fluorescence, contrast may be lost. For example, round brilliant cut, other shapes or cutting styles were not evaluated and may be affected differently. From MTF examples, contrast loss was measurable at line-pair frequencies less than 20 lp/mm for plates with Medium, Strong, or Very strong fluorescence.

In some examples a milky or hazy appearance observed in Fancy white, type IaB diamonds may be due to nanoinclusions or complex structural defects known as dislocation loops. Light scattering caused by these imperfections creates the milky or hazy appearance in these diamonds and affects their transparency. When observed with a diamond in the face-up orientation, scattering may have the similar appearance of contrast loss in the facet pattern as that caused by fluorescence. When a diamond is strongly fluorescent and also contains light scattering structural defects, these producers of contrast loss seemingly combine to cause the diamond to appear noticeably milky or hazy. In some examples, the determination of fluorescence may be included in an automatic grade as described herein. Such a fluorescence grade may be combined with if not as a stand alone grade, with the transparency or haziness grade for a more fulsome grade or combination of grades for a gemstone.

Figure 9:
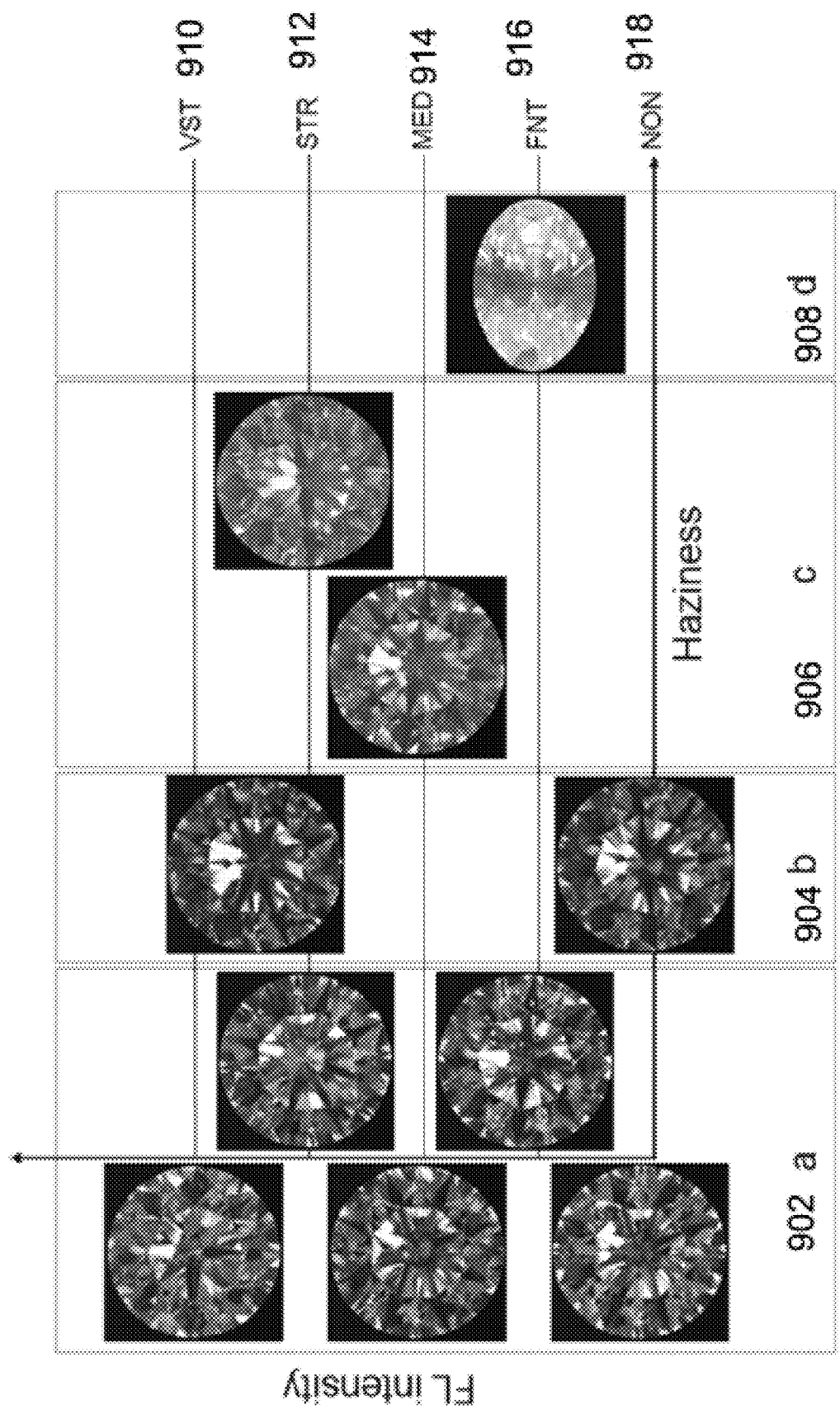
FIG. 9 is an illustration of analysis charts according to certain aspects described herein.

FIG. 9 shows examples of how diamond images of different haziness in transparency are plotted by fluorescence intensity from lowest of non-existent fluorescence "NON" 918, to faint "FNT" 916, to medium "MED" 914, to strong "STR" 912, to very strong "VST" 910. Diamonds which have the same color grade may be examined with similar proportions, and fluorescence descriptions ranging from None to Very Strong which do not have a hazy appearance (FIG. 9a, 902). A diamond with a NON fluorescence description and a diamond with Strong fluorescence may both show the same amount of slight haziness (FIG. 9b, 904). Diamonds with Medium and Strong fluorescence may have very obvious haziness (FIG. 9c, 906), and a diamond with Faint fluorescence that was so milky it received a Fancy White color grade (FIG. 9d, 908). The information may help assign a score and allow an observer to see whether a fluorescence presence in a particular sample affects haziness in the sample. As such, the information may be useful or desired for a grade, such that a transparency or haziness grade and a fluorescence grade for a gemstone may be automatically determined as described herein, and assigned to that gemstone for grading and reporting purposes.

Figure 10:
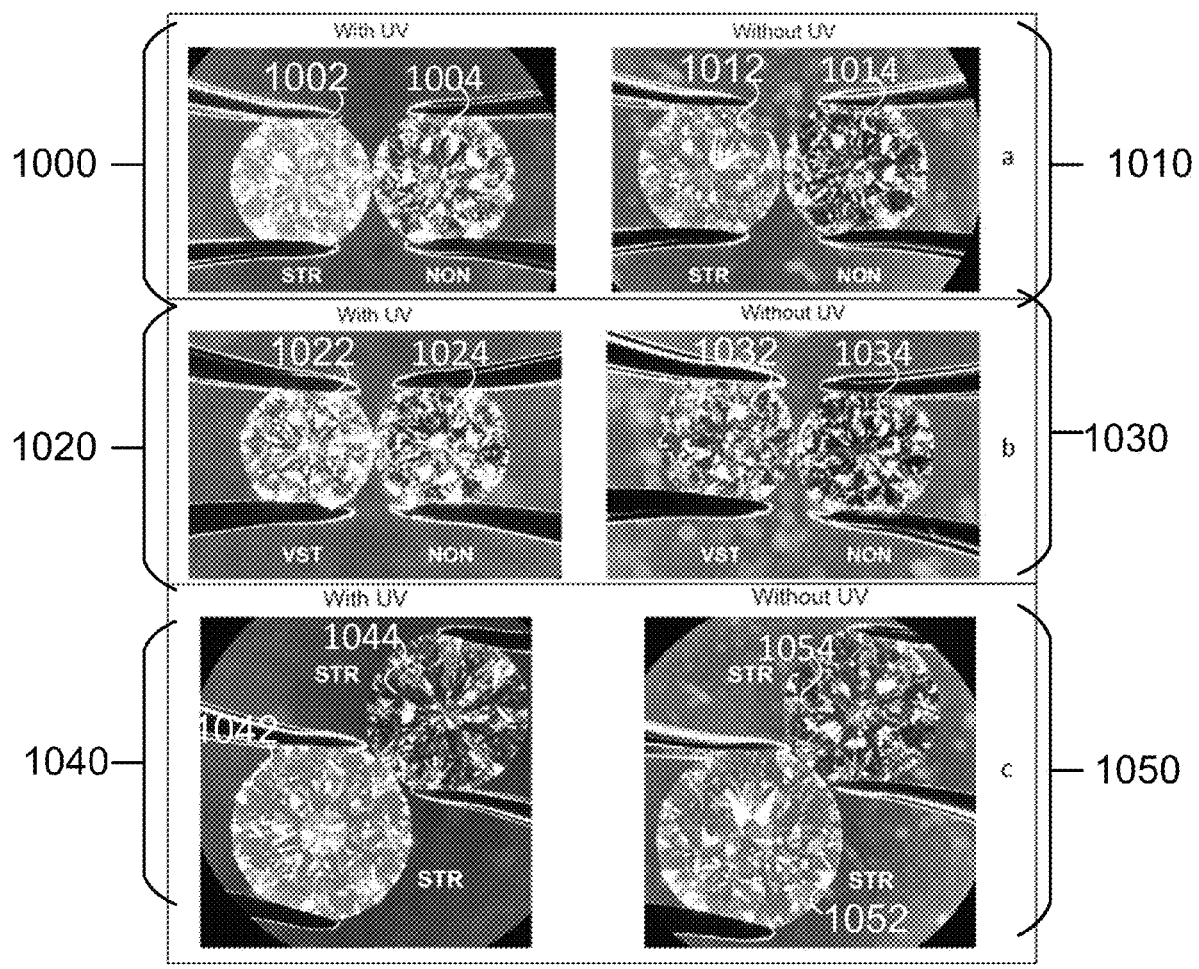
FIG. 10 are illustrations of samples under different light variations under analysis according to certain aspects described herein.

FIG. 10 shows sets of diamonds with different UV intensities examined and imaged under microscope darkfield illumination with UV content and without UV content. In order to distinguish between haziness created by light scattering and contrast loss due to fluorescence, pairs of diamonds with pertinent differences were compared in two different microscope darkfield lighting environments (discussed in FIG. 4A): one containing UV and one without UV.

In row FIG. 10a, with UV 1000, the diamond with a None fluorescence description 1004 appears quite clear, while the diamond with Strong fluorescence 1002 looks very hazy. Without UV 1010, the diamond with Strong fluorescence 1012 is still hazy, though to a somewhat lesser degree, and the None fluorescence description 1014 appears quite clear. Thus, it appears that fluorescence is not the main contributor to the haziness of this diamond.

In row FIG. 10b shows two G color diamonds with no apparent haziness with UV 1020 and without UV 1030. Viewed under the microscope lighting with UV 1020 content, one can see blue luminescence from the diamond with Very Strong fluorescence 1022. The one with none fluorescence description appears quite clear with UV 1024 and without UV 1034. However, this diamond with Very Strong fluorescence does not show obvious haziness under lighting environments with UV 1022 or without UV 1032 content.

The last pair shown in row FIG. 10c are two diamonds, both with Strong fluorescence. Without UV 1050, one appears clear 1054 while the other is hazy 1052. With UV 1040, the same thing may be observed, one appears clear 1044 while the other is hazy 1042. However, it appears that the haziness of the diamond together with the fluorescence 1040, makes the stone look brighter and whiter. Combination grades of transparency or haziness grade and a fluorescence grade for a gemstone may be automatically determined as described herein.

Multiple Scores for UV and without UV

Contrast reproduction and optical resolution of diamond samples with a range of fluorescence intensities with Modulation Transfer Function may be made while samples are exposed to UV and while they were not exposed to UV. An example embodiment may allow the system and methods to show whether or not a diamond will look more hazy or transparent when exposed to fluorescent light as a property of the diamond material, and produce a grade of such because some diamonds have such a fluorescence and some do not.

By comparing measurements of samples with different fluorescence intensities, the effect of fluorescence on contrast reproduction and optical resolution can be observed and used to grade a gemstone. When such determinations are made using the digital imaging and related computer software analysis as described herein, this may be used to automatically grade a gemstone haziness or transparency. For example, contrast measurements may be collected with and without UV are normalized to a single maximum measured contrast used to compare to a look up table and determine a grade.

Figure 11:
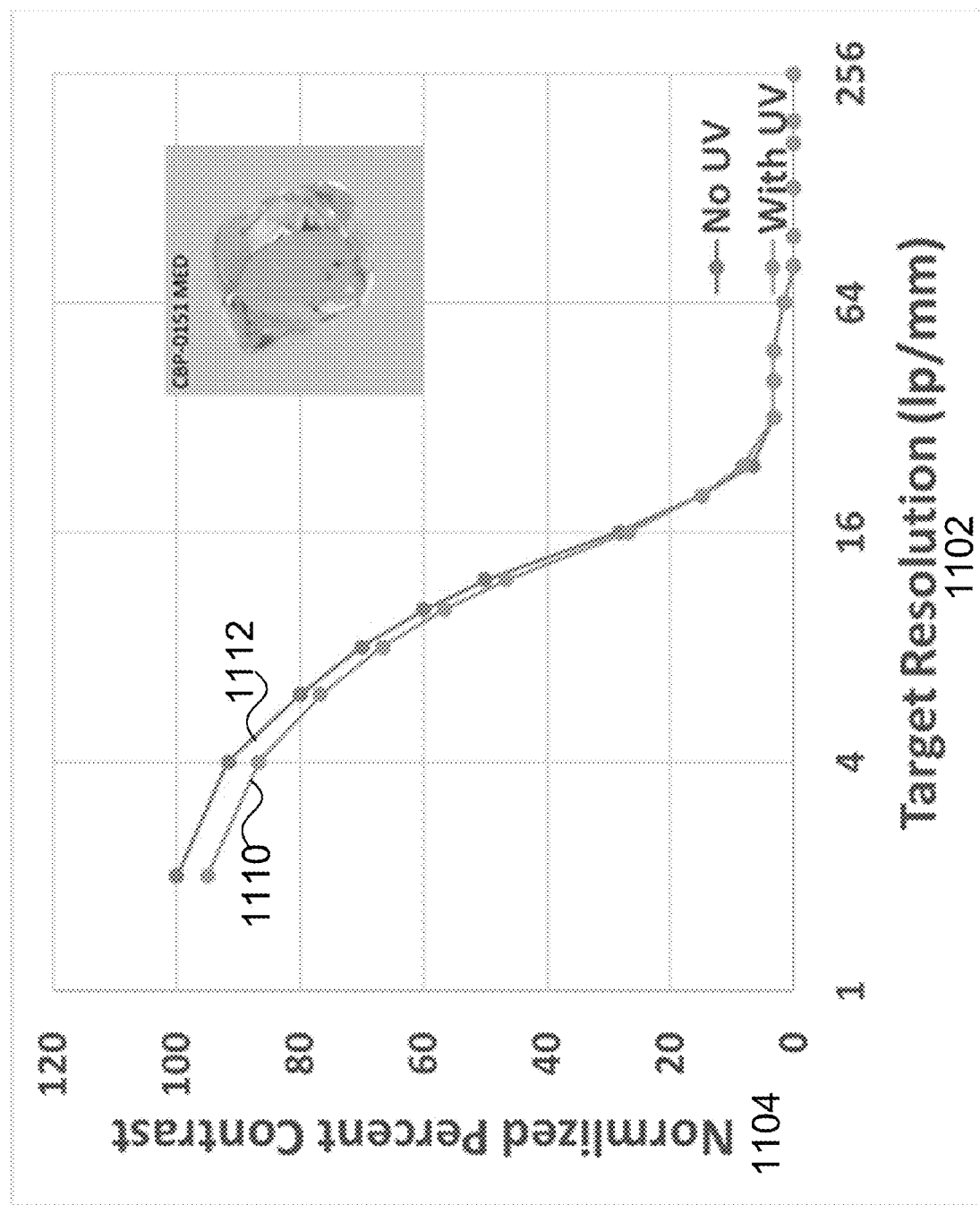
FIG. 11 is an illustration of example analysis charts according to certain aspects described herein.

In some examples, two lighting conditions, one without UV and one with UV, may be used to image the gemstone as described herein, and then the software may compare the two contrast grades. In such a way, the system may be able to determine if the fluorescence of the diamond is causing difference in contrast. Such a comparison of MTF measurement is shown in FIG. 11 for a diamond with medium fluorescence. The reduction in percent contrast values under UV excitation indicates contrast loss due to fluorescence. For example, FIG. 11 shows differential percent contrast measurements for one diamond with medium fluorescence. In this figure, the X-axis units 1102 are line-pairs per millimeter and the Y-axis units 1104 are normalized percent contrast.

As shown in FIG. 4D, the diamond sample 481 may be moved to image through the diamond the different groupings of black and white lines 480. Showing results of series of measurements. FIG. 11—X axis 1, 4 16, squares with BW lines, thick and then thin across the X, line pairs per MM. Fat is 2 pairs, fine lines 64 pairs of lines per millimeter. Dots are measurements of line pair groups. Difference between contrast with and without UV for line pair groups.

These different line pairs are the different groupings of black and white lines 480 in FIG. 4D and plotted in FIG. 11. Because the contrast values for the series collected with UV exposure 1110 are less than the contrast values for the series collected without UV exposure 1112, a reduction in contrast due to UV exposure is measured in this fluorescent diamond plate. This information may be included in a grade assigned by the software to this particular gemstone diamond.

Figure 12:
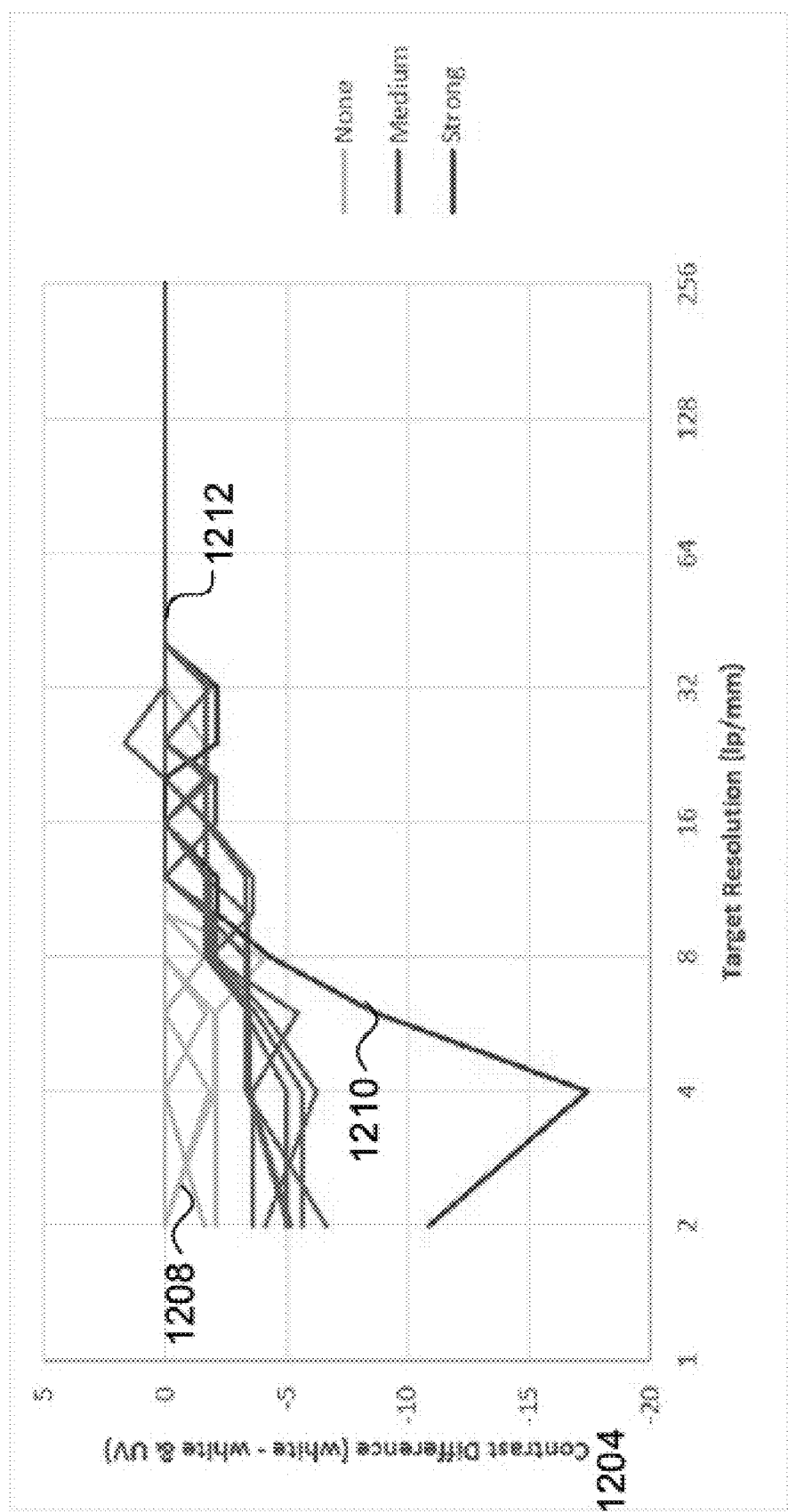
FIG. 12 is an illustration of example analysis charts according to certain aspects described herein.

FIG. 12 depicts a graph showing contrast difference on they axis 1204 plotted against target resolution on the x axis, 1202. The none stones 1208, medium stones 1212 do not show much contrast difference, but the strong stones 1210 at low target resolution have a much lower contrast difference. That is, the differences in contrast 1204 between measurements made with and without UV exposure for the thirteen diamond plates examples show fluorescent samples to have reduced contrast when exposed to UV while inert samples are unaffected.

Figure 13:
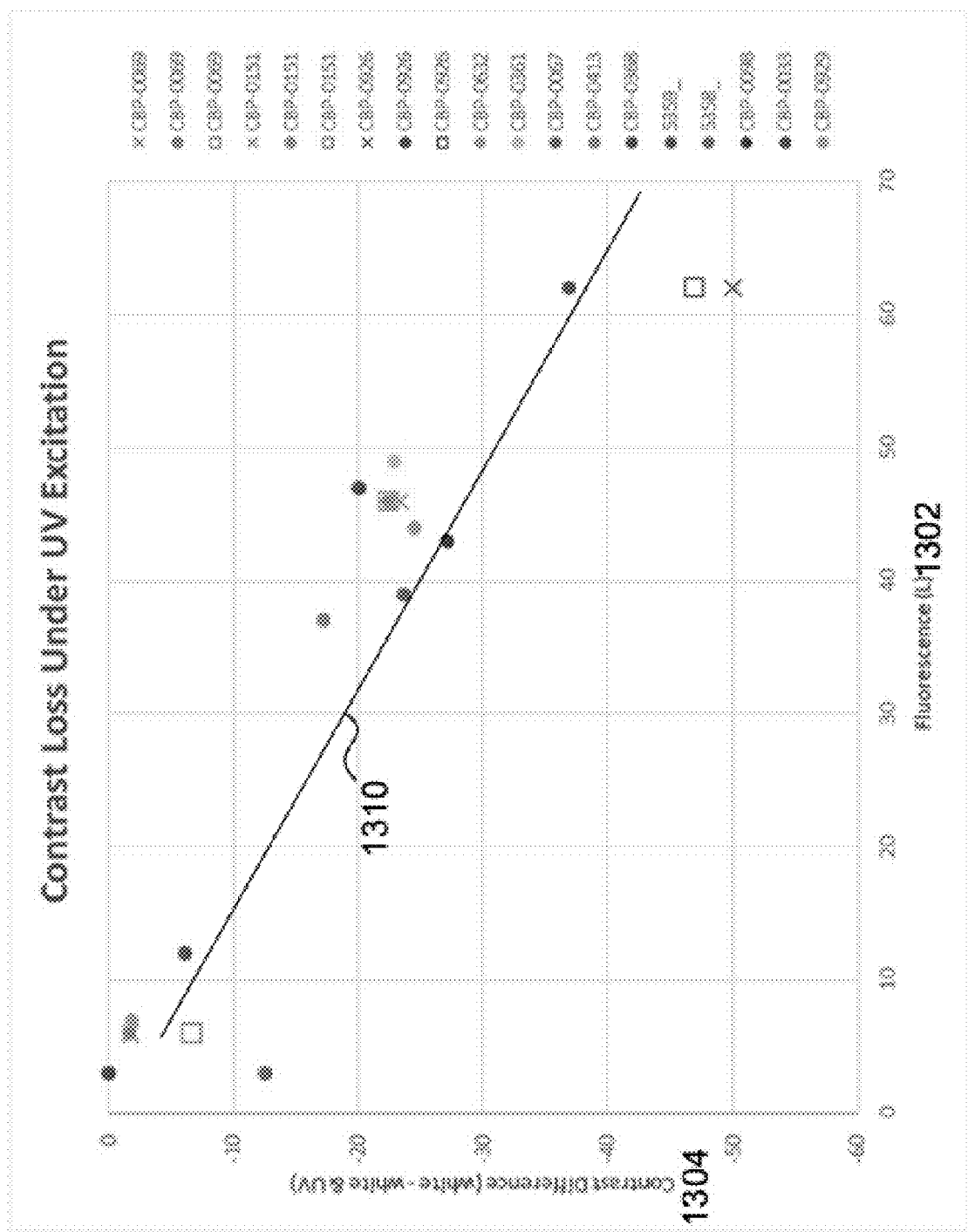
FIG. 13 is an illustration of example analysis charts according to certain aspects described herein.

FIG. 13 plots fluorescence 1302 on the x axis and contrast difference on they axis 1304. The summed contrast difference on they axis 1304 for each sample is plotted against fluorescence intensity on the x axis 1302 in FIG. 13 and show a correlation between these two factors. Replicated measurements for three samples are included in this figure to demonstrate measurement repeatability. The observed changes in contrast difference 1310 do not correlate with strain intensity in the diamonds or the diamond type, strongly suggesting that contrast loss is primarily due to the fluorescence.

Thus, fluorescence intensity may have an effect on contrast difference from measurements made with and without UV. It may therefore be useful to automatically grade the haziness or transparency of a diamond and grade the fluorescence of the same diamond and use both scores in combination with one another.

Illumination Standardization

Fluorescence is an intrinsic property of more than 30% of diamonds. Some in the diamond trade argue that because typical office lighting lacks 365 nm and 385 nm UV content, they see the true color of diamonds under office lighting.

Figure 14:
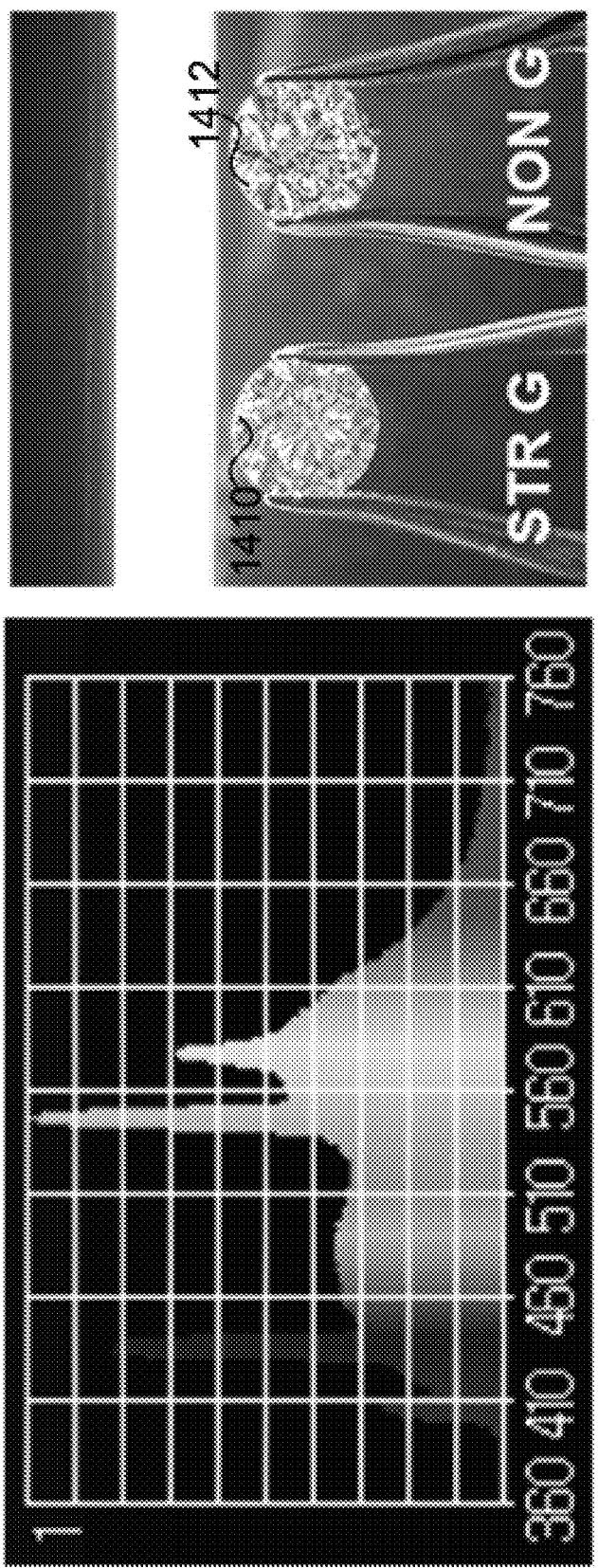
FIG. 14 is an illustration of example analysis charts and samples according to certain aspects described herein.

However, blue fluorescence may be caused by the N3 defect can be activated by wavelengths up to 420 nm. If a lighting environment includes light in the 390 nm to 420 nm range, a diamond's color will be viewed with some amount of blue fluorescence from the N3 defect. While most commercial light sources do contain light in the 400 nm to 420 nm range (blue light) but not in the UV range (<400 nm), varying the amount of UV light, and thus the fluorescence produced, may affect a diamond's appearance. Take, for example, a fluorescent lamp with no emission below 390 nm as shown in FIG. 14, 1402. Two G color diamonds, with strong fluorescence (1410, left) glows blue in this light as compared to a diamond with no fluorescence (1412, right) which does not. This illustrates the importance of using standardized illumination with fixed UV content to define the true color of a diamond. FIG. 11.

UV content is typically reported as a peak intensity output percentage normalized to a certain wavelength. However, depending on the shape and position of the UV peak, the fluorescence reaction will differ and consequently the visual appearance of the fluorescence and its effect on diamond color will be different as well. In order to consistently evaluate fluorescence and its effects on overall diamond appearance, an agreed-upon standard of illumination for color measurement and visual observation with a fixed UV content of specific known wavelength may be used.

Fluorescence N3 Center Excitation Curve

A metric when looking at a light source may include how much UV light it contains. However, quantifying the amount of UV present in a light source is not a straightforward thing to do in such a way that is useful in understanding the effect of fluorescence intensity. Different wavelengths of UV light will excite the N3 defect at different efficiencies, meaning different wavelengths will produce different quantities of emissions.

Figure 15:
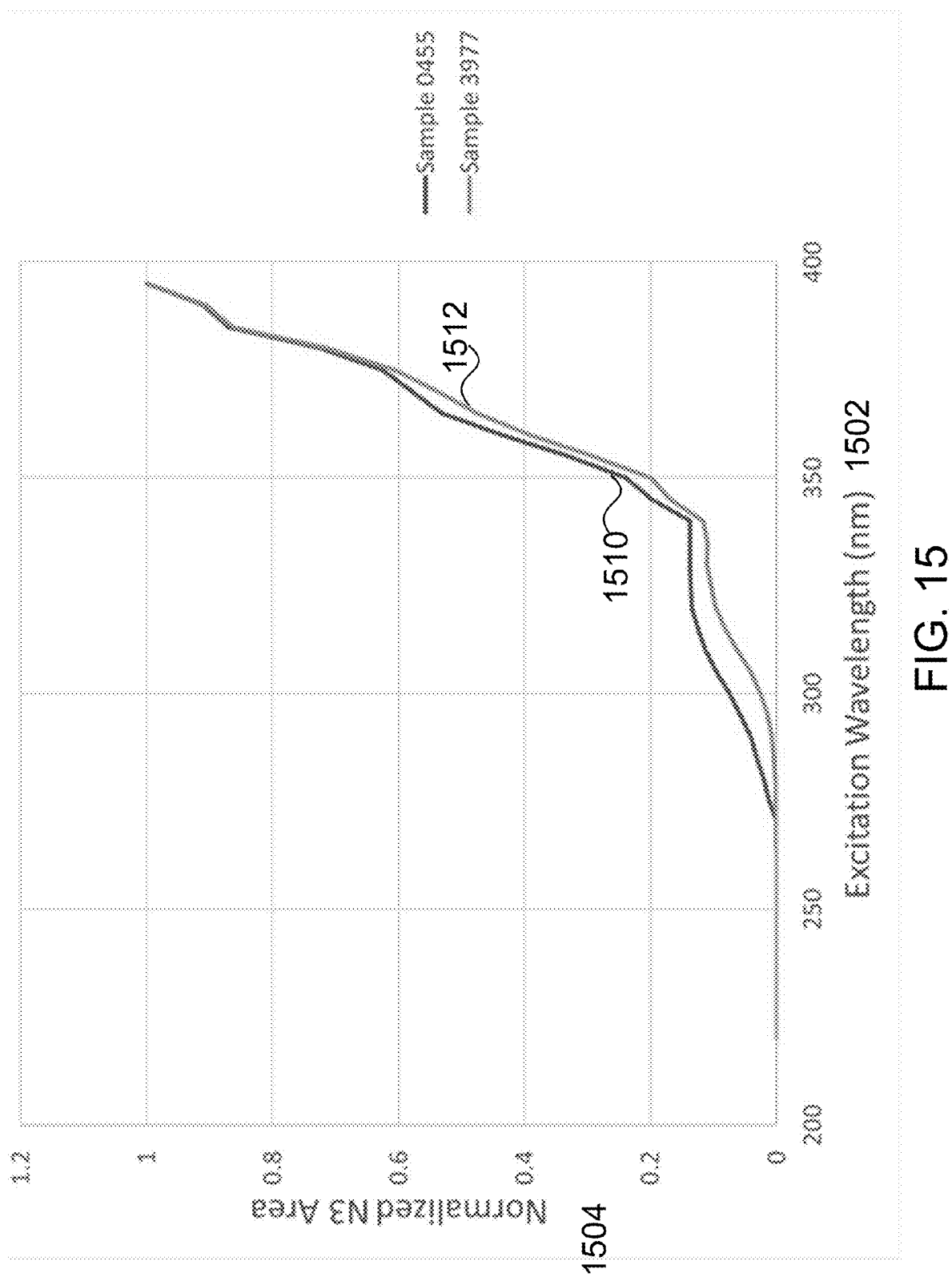
FIG. 15 is an illustration of example analysis charts according to certain aspects described herein.

As an example of how the different wavelengths affect the N3, data from two samples were run on a luminescence spectrometer that excites the sample with a narrow band of light and records the emission spectrum was used. The chart in FIG. 15 shows the normalized area 1504 under the N3 zero-phonon line against the excitation wavelength. From 225 nm to 275 nm there may be no emission for the excitation used. From 275 nm to about 340 nm there is a slow increase, and then from 340 nm to 395 nm there is a rapid increase. Above 395 nm the excitation band overlapped too much with the N3, so accurate area measurements were not possible. The shape of these plot tracks with the previously reported PLE spectrum of the 440 nm side band of the N3.

A light source used to inspect or grade diamonds may contain some amount of UV, likely bands of different wavelengths. All of these different wavelengths will interact with the N3 defect, and based on the efficiency of absorption and fluorescence reaction, will all contribute varying amounts to the total visual fluorescence. If the area under the N3 is used as a proxy for visual fluorescence intensity, then the wavelength of the UV source may affect the intensity of the fluorescence. Based on the chart in FIG. 15 a stone excited with a given intensity of 350 nm light may be approximately a third as bright as the same stone excited with an equal amount of 375 nm light.

As shown for example in FIG. 15, two samples 1510, 1512 containing N3 were excited with different narrow bands of light and the emission spectra recorded. The area under the N3 zero-phonon line was calculated for each spectrum and plotted against its excitation wavelength, with both plots being normalized to one.

Blue Fluorescence Effect on Color and Brightness

Figure 16:
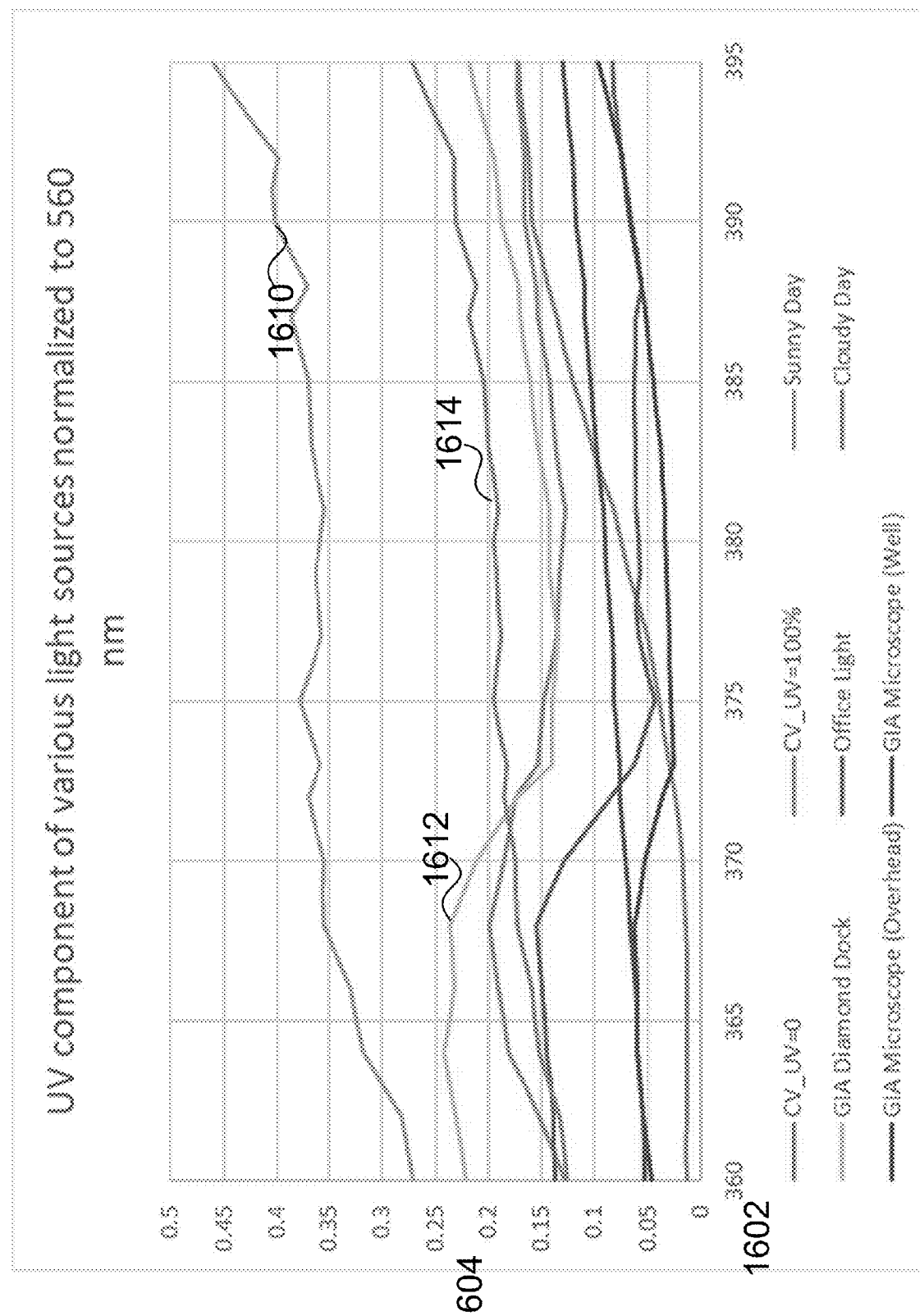
FIG. 16 is an illustration of example analysis charts according to certain aspects described herein.

FIG. 16 shows the UV component 1604 of a number of common light sources, all normalized to the full spectrum's value at 560 nm 1602. If these spectra are multiplied by the normalized N3 area curves and integrate that total area, and compared to the relative fluorescence brightness from each light source. Table 3 below, shows examples of some results. The expected fluorescence brightness for the table-down color measurement system at UV=0% is not 0, but is over half the value of the system at UV=17%, due to a slight UV component of the LEDs used to generate the 'white light' portion of the spectrum. In some examples, even a system labeled as a 'white light' source may contribute to fluorescence.

TABLE 3

To compare different light sources, the integrated area under the normalized N3 area excitation curves (N3) multiplied by the UV component of the listed light source (normalized to 560 nm) (UV) from 360 nm to 395 nm i.e. $\int_{360}^{395}$ N3 × UV dλ.

| Light Source | Total Area |
| --- | --- |
| microscope overhead light | 11.09 |
| Office light | 16.41 |
| Color measurement system with no UV | 18.18 |
| microscope well light | 18.71 |
| Color measurement system with UV | 30.95 |
| Diamond Dock | 36.62 |
| Daylight - cloudy day | 40.22 |
| Daylight - sunny day | 73.96 |

As shown in FIG. 16, a comparison of the UV content 1604 of different common light sources including color measurement system, Diamond Dock 1612, Microscope overhead and well light, office light cloudy day 1614, sunny daylight 1610 are shown.

One solution is to consistently use approximately 2% UV content in evaluating stones as a standard for daylight approximation. Using this standard for UV content is shown in the example of Table 3, but if diamonds with similar color, but different fluorescence intensities, are brought into an environment with higher UV content—such as outdoors under daylight, one might not expect to see any observable change in color or brightness among diamonds with None, Faint, or Medium fluorescence descriptions. In contrast, changes in color and brightness in diamonds with Strong or Very Strong fluorescence may make them appear more colorless. If these same diamonds are viewed in an environment with reduced UV content, diamonds with None, Faint, or Medium fluorescence will appear unchanged while diamonds with Strong or Very Strong fluorescence will appear more yellow and less bright.

Characterize Contrast Loss Caused by Fluorescence and Haziness

Both fluorescence and light scattering may cause contrast loss at a diamond face-up, and it can be difficult to distinguish between their effects. A Bulk Contrast Evaluation system may be used to measure contrast loss in cut diamonds to automatically assign a haziness score using image analysis. Similarly to the MTF discussion above, which analyzed diamond plates, able to be seen through, a Bulk Contrast Evaluation may allow for transparency or haziness analysis of cut stones, which may not provide a nice diamond plate style window that is able to view a contrast target through the other side.

Such a contrast may allow for a haziness score or grade to be assigned, and in some examples, combined with a blue fluorescence score or grade. Such an analysis may be used in an automatic grading system using digital image analysis as described herein. In such examples, an image of a diamond is taken to determine a transparency or haziness grade.

Calibration Examples

It should be noted that calibration procedures may be useful in calibrating a system to ensure that the images taken of the diamond for haziness or transparency grading, are properly calibrated to compare to the look up or boundary table.

If the brightness values of the sample are not the same or calibrated to be the same as those used to create the standard look up or boundary table, then the grade may be affected. In such a way, a set of sample brightness values may be imaged by the system and a calibration curve may be used to adjust the captured images of the sample diamond, to ensure the brightness values are correctly calibrated to the standards of the lookup or boundary table.

In some examples, the calibration image may be used to calibrate the individual system such that images taken with it under those conditions, may be calibrated to the standards which are used for comparison of the numbers or scores to the boundary table or look up table as described herein. In calibration examples, an image is taken with the brightness standards and a calibration curve determined by the software, such that a brightness correction may be applied for all other images taken with that particular system to ensure a proper comparison.

Figure 17A:
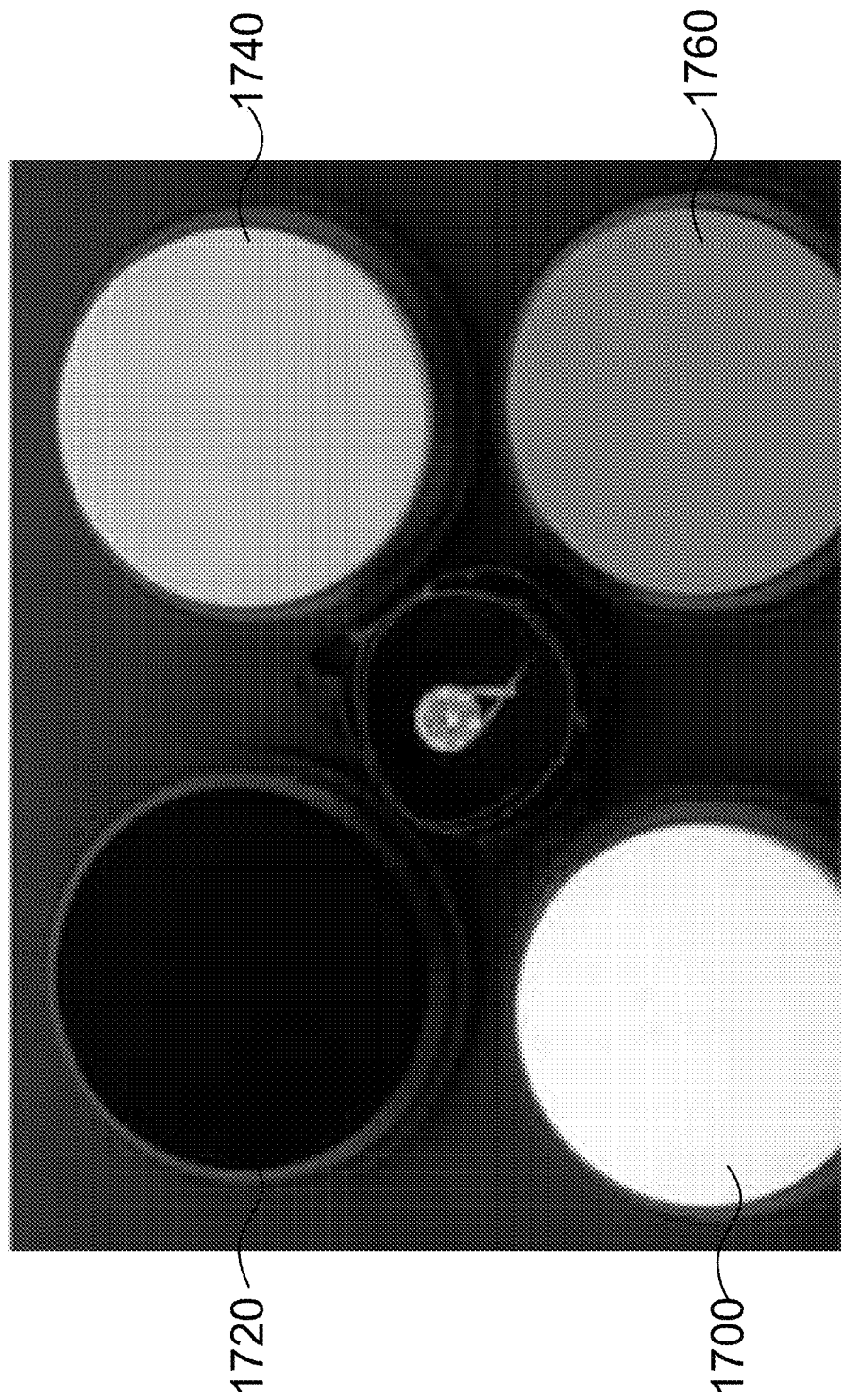
FIG. 17A is an illustration of brightness standards analysis according to certain aspects described herein.

FIG. 17A shows an example of the four reference brightness standards 1700, 1720, 1740 and 1760 from which a computer software may determine a calibration curve. By imaging the standards, the system may analyze the captured image and adjust the brightness levels perceived in such an image as a calibrated brightness offset or calibration to apply to the other captured images used for grading. The calibration brightness offsets may then be applied to other images taken by the system to ensure the images and other analysis on the images is properly compared to the reference standards and the lookup or boundary tables to assign the scores.

Once calibrated, the system may be used as described herein, to capture images of diamonds to automatically grade transparency or haziness.

Haziness Grade with Image Analysis

Figure 17B:
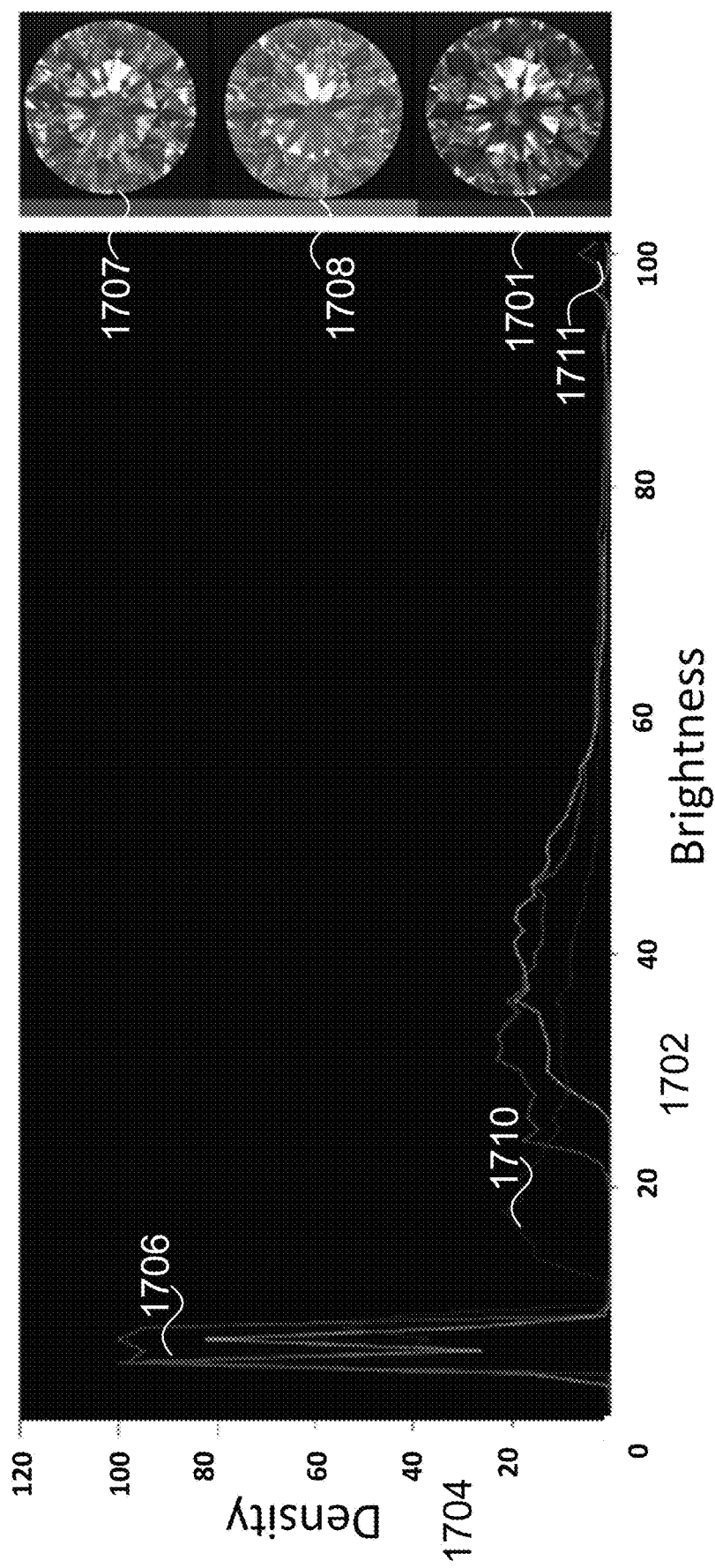
FIG. 17B is an illustration of example analysis charts according to certain aspects described herein.

FIG. 17B shows three different diamonds 1701, 1708, 1707 and corresponding histograms or plots of brightness scores for the pixels in the images of the three diamonds. Using an example of three diamonds in FIG. 17B just shows the outcomes of different haziness scores, and is not limiting in any way. In use, one diamond at a time may be analyzed. Showing multiple plots on the same chart is just for demonstration purposes, and could be used for comparison purposes, but is not limiting or necessary in any way. The description below is in regards to a single stone analysis and plot, using the images of FIG. 17B for demonstration purposes only.

In taking a Bulk Contrast Evaluation image, a digital image of a diamond or other gemstone is captured using one of the hardware systems described herein. The digital image may then be brightness corrected after analysis and application of the determined calibration curve as described. Next, the software may analyze the pixels in the digital image of the entire face up diamond as shown in FIG. 17B for brightness. In such a way, each pixel in the image is assigned or scored for brightness. The systems and methods here may then plot the analyzed and brightness scored pixels, for the particular sample, in a graph which may be displayed on a user interface, or merely determined by the software for analysis.

The X-axis units 1702 in FIG. 17B are brightness, where 0 is darkest and 100 is brightest. The Y-axis units 1704 describe the quantity of pixels in the image which have the corresponding brightness value. For a relatively clear diamond (bottom) 1701, a distance may be seen between the majority of dark pixels and the majority of bright pixels. As the sample diamonds gets hazier (middle) 1708 and (top) 1707, contrast loss may occur—pixels comprising the dark areas in the facet pattern may be brighter, and bright areas in the facet pattern may be darker.

The example plot includes the number or count of pixels in the image on the Y axis 1704 for the range or scale of brightness of each brightness scored pixel along the X axis 1702. In such a plot, the number of pixels the software has determined to be of each brightness value across the scale are counted and charted, regardless of where in the image they are found. In the example of FIG. 17B, the far left of the brightness X axis scale 1702 toward the 0, would be very dark pixels and the far right of the X axis scale 1702 toward 100, would be very light colored pixels, and the height of the plot for each sample would merely be the count the number of pixels the software scored for a particular image in terms of brightness, irrespective of where in the image those pixels were located.

As shown in FIG. 17B, because a round table up diamond is analyzed, a lot of pixels appear very dark because those are the background corners of the captured image. These high peaks 1706 on the very dark end of the X axis brightness scale 1702 are not in the diamond itself and therefore do not factor into the transparency or haziness analysis here. Those pixels may be removed from the analysis or discounted by the systems and methods here.

The graph next shows a large hump, bump, or otherwise curve of darker side pixel counts for each analyzed diamond 1710. These darker side curves may be analyzed by the computer software to determine a center of this dark curve 1710. This determined center of the dark curve on each sample diamond may be determined by the systems and methods here by averaging the pixel counts within that identified dark side curve, and a center or average or middle brightness score of the dark curve may be determined.

The far right of the brightness X axis scale 1702 also shows another peak 1711 of pixel counts for each sample diamond. These are the brightest pixels analyzed in the captured image, and are closest to brightest white pixels. Again, the software may analyze this high end brightness peak 1711 and determine a middle, center, or average of this high end peak or curve and determine a high end peak brightness score.

Once the system and methods have determined a low end or dark curve score 1710 for a sample diamond, and a high end brightness curve score 1711 for the same sample diamond, the system may determine a delta, or difference between these two scores for one sample diamond.

For example, a high delta or difference score would show that the diamond has low haziness or high transparency. That is because the system determines that the image of that gemstone has a greater brightness range between the bulk of the number of dark pixels and bulk of the number of brightest pixels.

In contrast, a diamond with a smaller delta or difference score would show that the diamond has high haziness or low transparency. That is because the system determines that the image of that gemstone has a smaller brightness range between the bulk of the number of dark pixels and bulk of the number of brightest pixels.

In such a way, contrast differences between an image darker pixels and an image brighter pixels may be used to determine haziness instead of using the MTF system described above which necessitates imaging through a diamond. Here, a cut diamond may also be graded for haziness even if gradient scales are not able to be viewed through them.

That delta or difference between the low end curve and high end curve may be used to compare to a look up table or boundary table of predetermined scores in order to grade the haziness or transparency of each sample diamond. Such a boundary table or look up table may be previously determined based on known or perceived values and accessed by the software to determine grades of haziness or transparency or clarity. By so comparing the delta or difference brightness scores or contrast comparison of an image of a diamond, a haziness or transparency score may be obtained automatically with computer image analysis of a digital image of the sample diamond.

Additionally or alternatively, the systems and methods here may also be used to alter the UV content in the light for analysis as described herein. By so altering the UV content in the light used for making haziness measurements, we can see how the presence of fluorescence (caused by UV excitation) affects the transparency/haziness of that diamond. In such examples, a combination of a haziness/transparency score, and a fluorescence score may provide additional information to a user about why and how the particular diamond looks the way it does. Such combination scoring may be useful and may be automatically determined using the systems and methods here.

Among the ~35% of gem diamonds that fluoresce, results strongly suggest that the color will be noticeably impacted in only those few that show Strong to Very strong blue fluorescence. These changes are more apparent when diamonds are viewed in the table-down orientation typically used for grading. The degree of impact depends strongly on the amount of UV component in the lighting source, meaning that a standardized lighting environment with a fixed amount of UV for consistency in color grading of diamonds. A UV content of 2% continues to serve as an appropriate compromise between the UV content in sunlight (3% to 5%) and that in most fluorescent and LED illumination sources used indoors (nominally 0%).

In some examples, increasing fluorescence may produce some contrast loss in gem diamonds. However, results show that this contrast loss from strong fluorescence, by itself, does not cause the milky or hazy appearance that is observed in some diamonds by the trade. Atomic scale defects in the diamond structure or nano-inclusions appear to be the main causes of the milky or hazy appearance described for most gem diamonds. The occurrence of strong fluorescence in combination with these features may cause a diamond to appear more milky or hazy, but that strong fluorescence, unto itself, may produce no noticeable haziness in diamonds that did not already contain light scattering structural defects or nano-inclusions. The bulk contrast method presented here may also serve as a good way to quantitatively evaluate the effect of contrast loss on apparent transparency in future diamond grading processes.

By determining both a fluorescence and haziness grade, a diamond may be graded for both, and compared thereby.

Example Network

Figure 18:
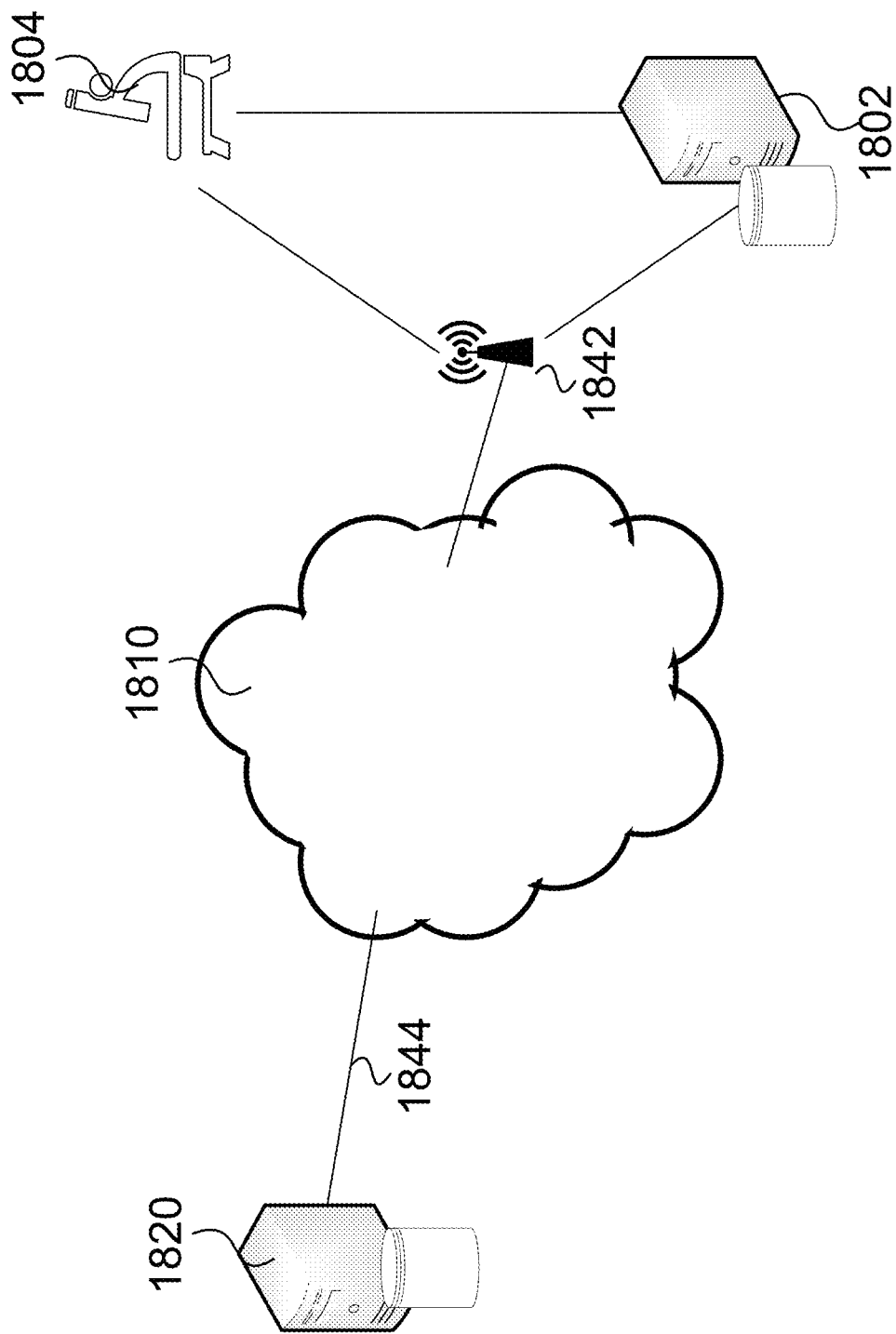
FIG. 18 is an illustration of an example computing network with certain aspects described herein.
Figure 19:
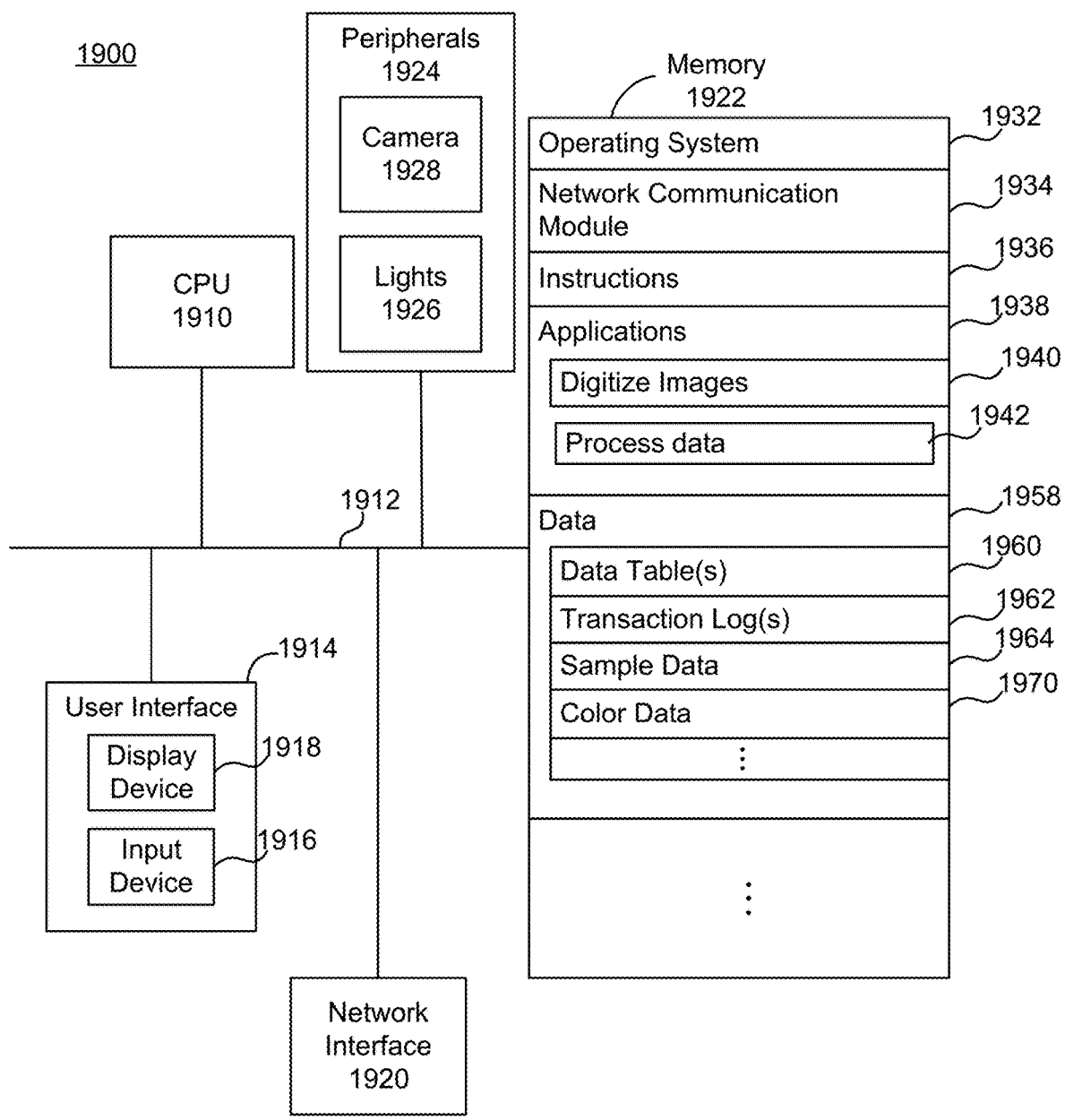
FIG. 19 is an illustration of an example computing system with certain aspects described herein.

FIG. 18 shows an example where the analysis systems 1804 are networked to and/or in communication with and/or include a computer 1802 and computer storage, such as a server computer or back end computer system as described in FIG. 19. In some examples, the computers 1802 may be in communication with a network such as the Internet 1810 and thereby to other back end resources such as computers 1820 and storage through land lines 1844, cellular and/or WiFi 1842 type example communication methods to any, either, or both computer systems 1802 and 1820. Such networked systems may include any or all of the hardware described here, and the computers described here. In any combination, alone or together, these hardware implementations may then communicate with one another as described.

Example Computer Devices

FIG. 19 shows an example computing device 1900 which may be used in the systems and methods described herein in any embodiment in any combination. In the example computer 1900 a CPU or processor 1910 is in communication by a bus or other communication 1912 with a user interface 1914. The user interface includes an example input device such as a keyboard, mouse, touchscreen, button, joystick, or other user input device(s). The user interface 1914 also includes a display device 1918 such as a screen and input device 1916. The computing device 1900 shown in FIG. 19 also includes a network interface 1920 which is in communication with the CPU 1910 and other components. The network interface 1920 may allow the computing device 1900 to communicate with other computers, databases, networks, user devices, or any other computing capable devices. In some examples, alternatively or additionally, the method of communication may be through WiFi, cellular, Bluetooth Low Energy, wired communication, or any other kind of communication. In some examples, alternatively or additionally, the example computing device 1900 includes peripherals 1924 also in communication with the processor 1910. In some examples, alternatively or additionally, peripherals include antennae 1926 used for communication. In some examples peripherals 1924 may include camera equipment 1928 and/or lights 1926. In some example computing device 1900 a memory 1922 is in communication with the processor 1910. In some examples, alternatively or additionally, this memory 1922 may include instructions to execute software such as an operating system 1932, network communications module 1934, other instructions 1936, applications 1938, applications to digitize images 1940, applications to process image pixels 1942, data storage 1958, data such as data tables 1960, transaction logs 1962, sample data 1964, color data 1970 or any other kind of data.

CONCLUSION

As disclosed herein, features consistent with the present embodiments may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the embodiments, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the descriptions have been specifically described herein, it will be apparent to those skilled in the art to which the descriptions pertains that variations and modifications of the various implementations shown and described herein may be made without departing from the spirit and scope of the embodiments. Accordingly, it is intended that the embodiments be limited only to the extent required by the applicable rules of law.

The present embodiments can be embodied in the form of methods and apparatus for practicing those methods. The present embodiments can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the embodiments. The present embodiments can also be in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the embodiments. When implemented on a general-purpose processor, the program code segments combine with the processor to provide a unique device that operates analogously to specific logic circuits.

The software is stored in a machine readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

What is claimed is:

1. A method for automatically grading a diamond haziness, the method comprising:
   capturing a digital image of a diamond with a digital camera;
   analyzing pixels in the digital image of the diamond by assigning a brightness value to each pixel in the captured image;
   plotting a count of each of the brightness values of the pixels in the digital image,
   wherein the plot of the count of each of the brightness values includes a curve on a dark side of the brightness values and a curve on a light side of the brightness values;
   determining a center of the dark curve in in the plot of the count of each of the brightness values of the pixels in the digital image and the associated brightness average of the dark curve;
   determining a center of the light curve in the plot of the count of each of the brightness values of the pixels in the digital image and the associated brightness average of the light curve;
   determining a difference between the brightness average of the light curve and the brightness average of the dark curve;
   using the difference between the brightness average of the light curve and the brightness average of the dark curve to assign a haziness score to the diamond.

2. The method of claim 1 wherein the charting of the brightness values in the pixels is of all pixels in the captured image;
   wherein any background pixels are discounted.

3. The method of claim 1 wherein the charting of the brightness values in the pixels is of pixels determined to be of the diamond and not a background.

4. The method of claim 3 wherein the determination of the diamond is by pixel edge detection.

5. The method of claim 1 wherein the using the difference between the brightness average of the light curve and the brightness average of the dark curve to assign a haziness score to the diamond is by comparing the difference between the brightness average of the light curve and the brightness average of the dark curve to a lookup table of predetermined scores to determine the haziness score.

6. The method of claim 1 wherein the using the difference between the brightness average of the light curve and the brightness average of the dark curve to assign a haziness score to the diamond is by entering the difference between the brightness average of the light curve and the brightness average of the dark curve into an algorithm that determines the haziness score.

7. The method of claim 1 wherein a light illuminating the diamond for imaging includes 2% ultraviolet light.

8. The method of claim 7 further comprising, adjusting the light for illuminating the diamond to change the % ultraviolet;
   capturing a second digital image of a diamond with a digital camera;
   analyzing pixels in the second digital image of the diamond by assigning a brightness value to each pixel in the captured image;
   plotting a count of each of the brightness values of the pixels in the second digital image,
   wherein the plot of the count of each of the brightness values of the second digital image includes a curve on a dark side of the brightness values and a curve on a light side of the brightness values;
   determining a center of the dark curve in the plot of the count of each of the brightness values of the pixels in the second digital image and the associated brightness average of the dark curve;
   determining a center of the light curve in the plot of the count of each of the brightness values of the pixels in the second digital image and the associated brightness average of the light curve;
   determining a difference between the brightness average of the light curve and the brightness average of the dark curve in the second digital image;
   using the difference between the brightness average of the light curve and the brightness average of the dark curve of the second digital image to assign a second haziness score to the diamond;
   using a difference between the haziness score and the second haziness score to determine if the adjustment of the UV % in the light affected the second haziness score.

9. The method of claim 1 further comprising, before analyzing pixels in the digital image of the diamond by assigning a brightness value to each pixel in the captured image,
   capturing a digital image of a calibration setup, the calibration setup including a plurality of brightness standards,
   comparing the digital image of the calibration setup to known brightness values of the plurality of brightness standards to determine a brightness calibration curve.

10. The method of claim 9 further comprising, after analyzing pixels in the digital image of the diamond by assigning a brightness value to each pixel in the captured image,
    applying the determined brightness calibration curve to the analyzed pixels in the digital image of the diamond.

11. A system for analyzing a gemstone, comprising:
    a stage configured to support a gemstone for analysis;
    a hemispherical cover to the stage, configured to cover the stage,
       wherein the hemispherical cover includes a port for a digital camera directed at the stage,
       wherein the digital camera is in communication with a computer having a processor and memory;
    a fiber optic ring light around the stage inside the hemispherical cover;
    a first light controller in communication with the computer and in communication with a dichroic beam splitter wherein the first light controller includes a Ultra Violet (UV) light source and tunable UV adjusters;
    a second light controller in communication with the computer and in communication with the dichroic beam splitter wherein the second light controller includes a white light source,
    wherein the dichroic beam splitter is configured to direct both UV and white light to the fiber optic ring light;
    the computer configured to, receive a digital image from the camera of the gemstone on the stage,
    analyze pixels in the digital image of the gemstone with assignment of a brightness value to each pixel in the captured image,
    plot a count of each of the brightness values of the pixels in the digital image,
    wherein the plot of the count of each of the brightness values includes a dark curve and a light curve,
    determine a center of the dark curve in the plot of the count of each of the brightness values of the pixels in the digital image, determine a center of the light curve in in the plot of the count of each of the brightness values of the pixels in the digital image, determine a difference between the brightness average of the light curve and the brightness average of the dark curve, use the difference between the brightness average of the light curve and the brightness average of the dark curve to determine a haziness score to the diamond.

12. The system of claim 11 wherein the tunable UV adjusters are configured to allow a range of selectable UV from 1% to 5%.

13. The system of claim 11 wherein the UV light has a wavelength of approximately 365 nm.

14. The system of claim 11 wherein the fiber optic ring light is D65 temperature.

* * * * *